US012615397B2

(12) United States Patent
Yu et al.

(10) Patent No.: US 12,615,397 B2
(45) Date of Patent: Apr. 28, 2026

(54) INDEPENDENT HISTORY-BASED RICE PARAMETER DERIVATIONS FOR VIDEO CODING

(71) Applicant: GUANGDONG OPPO MOBILE TELECOMMUNICATIONS CORP., LTD., Dongguan (CN)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 12 days.

(21) Appl. No.: 18/685,141

(22) PCT Filed: Aug. 25, 2022

(86) PCT No.: PCT/US2022/075453
§ 371 (c)(1),
(2) Date: Feb. 20, 2024

(87) PCT Pub. No.: WO2023/028555
PCT Pub. Date: Mar. 2, 2023

(65) Prior Publication Data
US 2024/0364939 A1     Oct. 31, 2024

Related U.S. Application Data

(60) Provisional application No. 63/250,964, filed on Sep. 30, 2021, provisional application No. 63/248,819, (Continued)

(51) Int. Cl.
*H04N 19/96* (2014.01)
*H04N 19/124* (2014.01)
(Continued)

(52) U.S. Cl.
CPC ........... *H04N 19/96* (2014.11); *H04N 19/124* (2014.11); *H04N 19/18* (2014.11); *H04N 19/46* (2014.11)

(58) Field of Classification Search
CPC ...... H04N 19/96; H04N 19/124; H04N 19/18; H04N 19/46; H04N 19/176; H04N 19/1887; H04N 19/60; H04N 19/13
(Continued)

(56) References Cited

U.S. PATENT DOCUMENTS

2017/0064336 A1* 3/2017 Zhang .................. H04N 19/122
2022/0337812 A1* 10/2022 Rusanovskyy ...... H04N 19/174

OTHER PUBLICATIONS

Rusanovskyy et al. ("CE-related: On history-enhanced method of Rice parameter derivation for regular residual coding (RRC) at high bit depths", JVET-V0106, Apr. 20-28, 2021), copy provided by Applicant. (Year: 2021).*

(Continued)

*Primary Examiner* — Matthew K Kwan
(74) *Attorney, Agent, or Firm* — BAYES PLLC

(57) ABSTRACT

In some embodiments, a video decoder decodes a video from a bitstream of the video using a history-based rice parameter derivation. The video decoder accesses a binary string representing a partition of the video and processes each coding tree unit (CTU) in the partition to generate decoded coefficient values in the CTU. The process includes updating a replacement variable for a transform unit (TU) in the CTU for calculating rice parameters independently of the previous TU or CTU. The process further includes calculating the rice parameters for TU in the CTU based on the value of the replacement variable and decoding the binary string corresponding to the TU into coefficient values based on the calculated rice parameters. Pixel values of the TU can be determined from the decoded coefficient values for output.

8 Claims, 8 Drawing Sheets

Related U.S. Application Data filed on Sep. 27, 2021, provisional application No. 63/248,289, filed on Sep. 24, 2021, provisional application No. 63/260,604, filed on Aug. 26, 2021.

(51) Int. Cl.
 *H04N 19/18* (2014.01)
 *H04N 19/46* (2014.01)

(58) Field of Classification Search
 USPC .................................................... 375/240.12
 See application file for complete search history.

(56) References Cited

OTHER PUBLICATIONS

Bossen et al. ("VVC operation range extensions (Draft 4)", JVET-W2005-v1, Jul. 7-16, 2021), (Year: 2021).*
International Search Report in the international application No. PCT/US2022/075453, mailed on Jan. 10, 2023. 4 pages.

Written Opinion of the International Search Authority in the international application No. PCT/US2022/075453, mailed on Jan. 10, 2023. 7 pages.
Benjamin Bross et al, "Versatile Video Coding Editorial Refinements on Draft 10", Joint Video Experts Team (JVET) of ITU-T SG 16 WP 3 and ISO/IEC JTC 1/SC 29 JVET-T2001-v2, 20th Meeting, by teleconference, Oct. 7-16, 2020, the whole document. 513 pages.
Frank Bossen et al, "VVC operation range extensions (Draft 4)", Joint Video Experts Team (JVET) of ITU-T SG 16 WP 3 and ISO/IEC JTC 1/SC 29, JVET-W2005-v3, 23rd Meeting, by teleconference, Jul. 7-16, 2021, the whole document. 30 pages.
Dmytro Rusanovskyy et al, "CE-related: On history-enhanced method of Rice parameter derivation for regular residual coding (RRC) at high bit depths", Joint Video Experts Team (JVET) of ITU-T SG 16 WP 3 and ISO/IEC JTC 1/SC 29, JVET-V0106, 22nd Meeting, by teleconference, Apr. 20-28, 2021, the whole document. 14 pages.
Yu (Oppo) Y et al: "AHG8: Independent Rice Parameter Derivation for high bit depth and high bit rate extensions", 136. MPEG Meeting; Oct. 11, 2021-Oct. 15, 2021; Online; (Motion Picture Expert Group or ISO/IEC JTC1/SC29/WG11), No. m57930; JVET-X0129 Sep. 30, 2021 (Sep. 30, 2021), XP030297725, section 2, 3.
Supplementary European Search Report in the European application No. 22862273.4, mailed on Jun. 2, 2025. 11 pages.

* cited by examiner

CTU
302

| | | | CU 402 |
|---|---|---|---|
| CU 402 | CU 402 | CU 402 | CU 402 |
| | | | CU 402 |
| CU 402 | CU 402 / CU 402 | CU 402 | CU 402 |
| | CU 402 | CU 402 / CU 402 | |

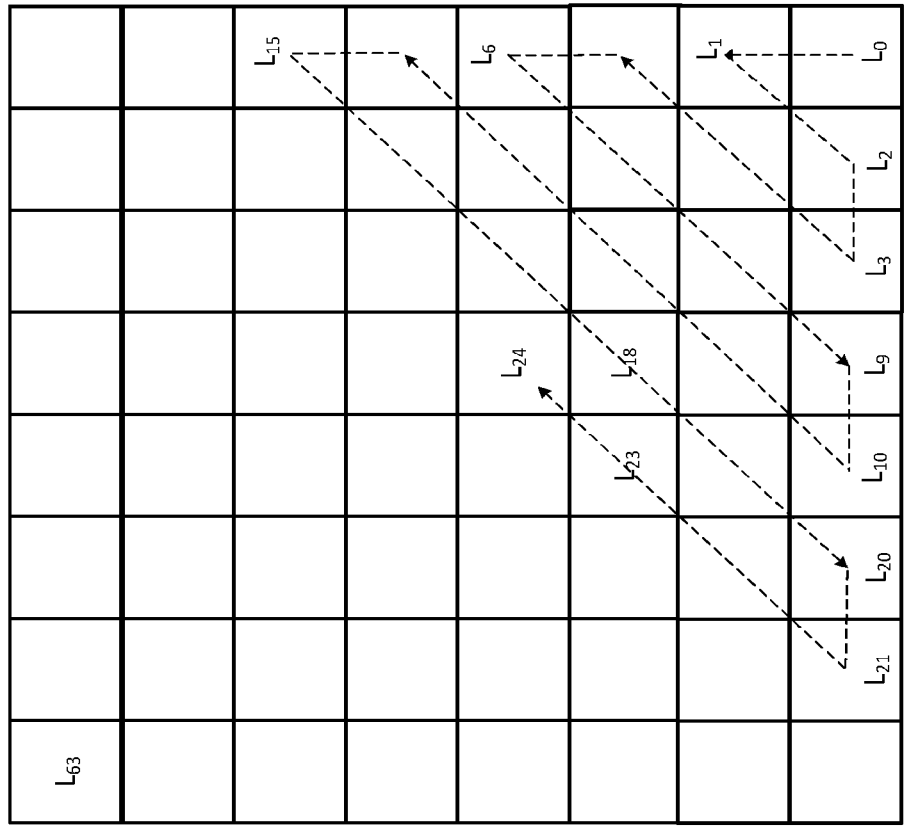
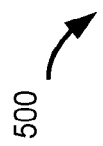
*FIG. 5*

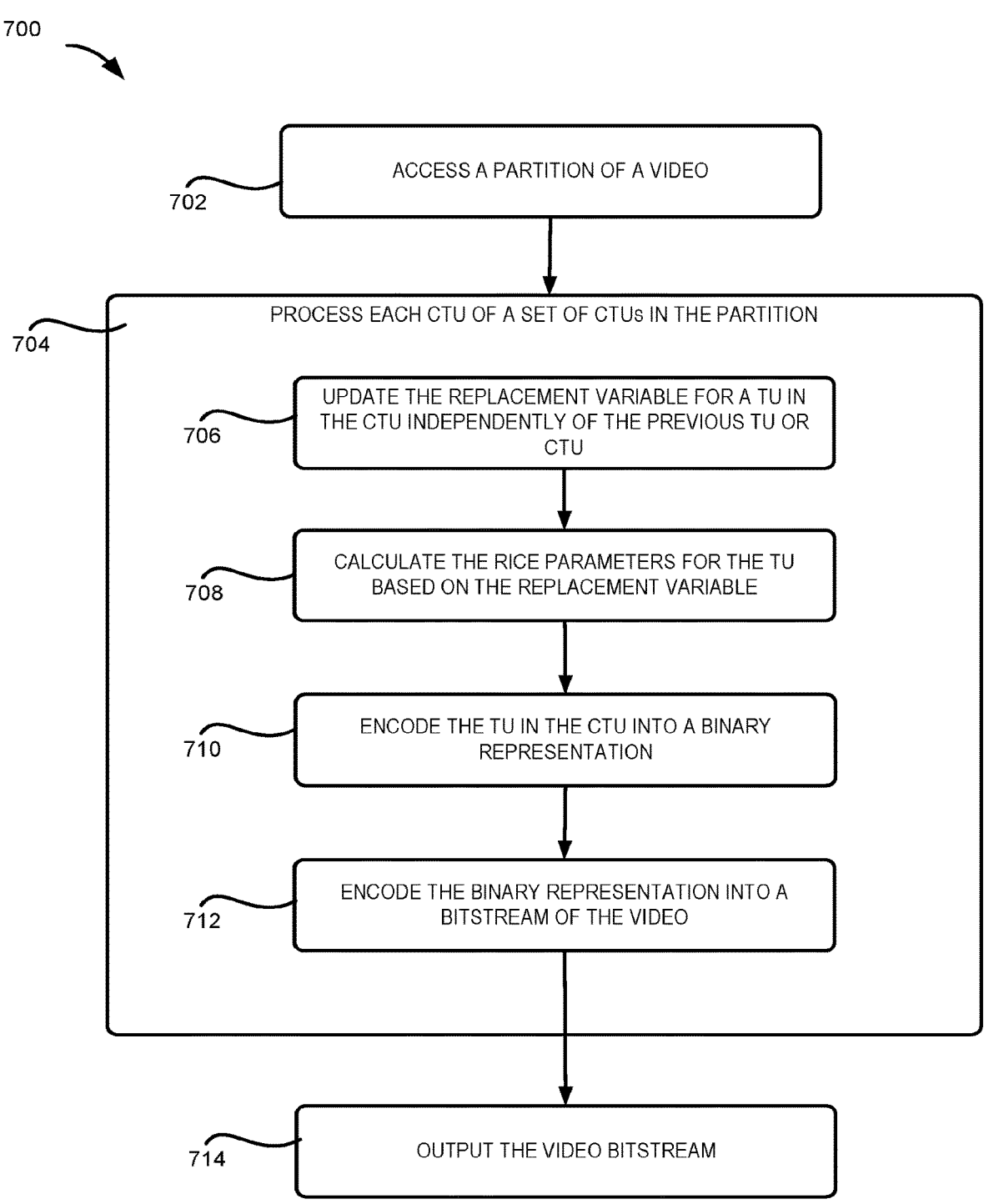

700

702 — ACCESS A PARTITION OF A VIDEO

704 — PROCESS EACH CTU OF A SET OF CTUs IN THE PARTITION

706 — UPDATE THE REPLACEMENT VARIABLE FOR A TU IN THE CTU INDEPENDENTLY OF THE PREVIOUS TU OR CTU

708 — CALCULATE THE RICE PARAMETERS FOR THE TU BASED ON THE REPLACEMENT VARIABLE

710 — ENCODE THE TU IN THE CTU INTO A BINARY REPRESENTATION

712 — ENCODE THE BINARY REPRESENTATION INTO A BITSTREAM OF THE VIDEO

714 — OUTPUT THE VIDEO BITSTREAM

FIG. 7

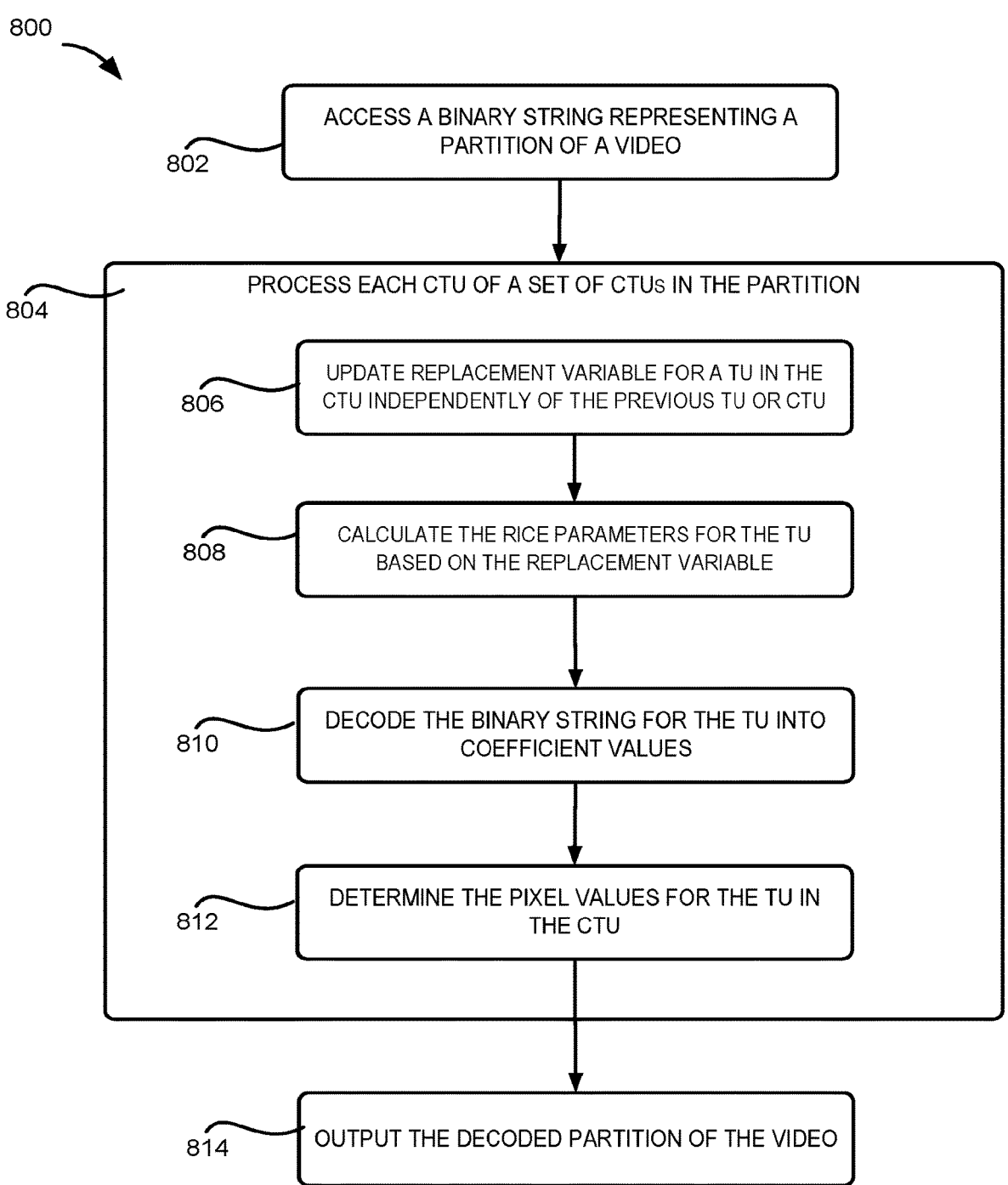

800

802 ACCESS A BINARY STRING REPRESENTING A PARTITION OF A VIDEO

804 PROCESS EACH CTU OF A SET OF CTUs IN THE PARTITION

806 UPDATE REPLACEMENT VARIABLE FOR A TU IN THE CTU INDEPENDENTLY OF THE PREVIOUS TU OR CTU

808 CALCULATE THE RICE PARAMETERS FOR THE TU BASED ON THE REPLACEMENT VARIABLE

810 DECODE THE BINARY STRING FOR THE TU INTO COEFFICIENT VALUES

812 DETERMINE THE PIXEL VALUES FOR THE TU IN THE CTU

814 OUTPUT THE DECODED PARTITION OF THE VIDEO

FIG. 8

INDEPENDENT HISTORY-BASED RICE PARAMETER DERIVATIONS FOR VIDEO CODING

CROSS-REFERENCE TO RELATED APPLICATIONS

This application is a national stage application of International Application No. PCT/US2022/075453, filed on Aug. 25, 2022, which claims priority to U.S. Provisional Application No. 63/260,604, entitled "Independent History Based Rice Parameter Derivations for Video Coding," filed on Aug. 26, 2021, U.S. Provisional Application No. 63/248,289, entitled "Independent History Based Rice Parameter Derivations For Video Coding," filed on Sep. 24, 2021, U.S. Provisional Application No. 63/248,819, entitled "Independent History Based Rice Parameter Derivations For Video Coding," filed on Sep. 27, 2021, and U.S. Provisional Application No. 63/250,964, entitled "Independent History Based Rice Parameter Derivations For Video Coding," filed on Sep. 30, 2021, which are hereby incorporated in their entirety by this reference.

TECHNICAL FIELD

This disclosure relates generally to computer-implemented methods and systems for video processing. Specifically, the present disclosure involves independent history based Rice parameter derivations for video coding.

BACKGROUND

The ubiquitous camera-enabled devices, such as smartphones, tablets, and computers, have made it easier than ever to capture videos or images. However, the amount of data for even a short video can be substantially large. Video coding technology (including video encoding and decoding) allows video data to be compressed into smaller sizes thereby allowing various videos to be stored and transmitted. Video coding has been used in a wide range of applications, such as digital TV broadcast, video transmission over the internet and mobile networks, real-time applications (e.g., video chat, video conferencing), DVD and Blu-ray discs, and so on. To reduce the storage space for storing a video and/or the network bandwidth consumption for transmitting a video, it is desired to improve the efficiency of the video coding scheme.

SUMMARY

Some embodiments involve independent history-based Rice parameter derivations for video coding. In one example, a method for decoding a video includes accessing a binary string representing a partition of the video, the partition comprising a plurality of coding tree units (CTUs); decoding each CTU of the plurality of CTUs in the partition, decoding the CTU comprising decoding a transform unit (TU) of the CTU by: updating a replacement variable HistValue for calculating Rice parameters for the TU, wherein updating the replacement variable HistValue is performed independently of another TU of the CTU that precedes the TU and another CTU of the plurality of CTUs that precedes the CTU; calculating the Rice parameters for the TU in the CTU based on the updated replacement variable HistValue; and decoding the binary string corresponding to the TU in the CTU into coefficient values of the TU based on the calculated Rice parameters; and determining pixel values for the TU in the CTU from the coefficient values; and outputting a decoded partition of the video comprising the decoded plurality of CTUs in the partition.

In another example, a non-transitory computer-readable medium has program code that is stored thereon, the program code executable by one or more processing devices for performing operations. The operations comprise accessing a binary string representing a partition of a video, the partition comprising a plurality of coding tree units (CTUs); decoding each CTU of the plurality of CTUs in the partition, decoding the CTU comprising decoding a transform unit (TU) of the CTU by: updating a replacement variable HistValue for calculating Rice parameters for the TU, wherein updating the replacement variable HistValue is performed independently of another TU of the CTU that precedes the TU and another CTU of the plurality of CTUs that precedes the CTU; calculating the Rice parameters for the TU in the CTU based on the updated replacement variable HistValue; and decoding the binary string corresponding to the TU in the CTU into coefficient values of the TU based on the calculated Rice parameters; and determining pixel values for the TU in the CTU from the coefficient values; and outputting a decoded partition of the video comprising the decoded plurality of CTUs in the partition.

In another example, a system comprises a processing device and a non-transitory computer-readable medium communicatively coupled to the processing device. The processing device is configured to execute program code stored in the non-transitory computer-readable medium and thereby perform operations comprising: accessing a binary string representing a partition of a video, the partition comprising a plurality of coding tree units (CTUs); decoding each CTU of the plurality of CTUs in the partition, decoding the CTU comprising decoding a transform unit (TU) of the CTU by: updating a replacement variable HistValue for calculating Rice parameters for the TU, wherein updating the replacement variable HistValue is performed independently of another TU of the CTU that precedes the TU and another CTU of the plurality of CTUs that precedes the CTU; calculating the Rice parameters for the TU in the CTU based on the updated replacement variable HistValue; and decoding the binary string corresponding to the TU in the CTU into coefficient values of the TU based on the calculated Rice parameters; and determining pixel values for the TU in the CTU from the coefficient values; and outputting a decoded partition of the video comprising the decoded plurality of CTUs in the partition.

In another example, a method for encoding a video comprises: accessing a partition of the video, the partition comprising a plurality of coding tree units (CTUs); processing the partition of the video to generate a binary representation of the partition, the processing comprising: encoding each CTU of the plurality of CTUs in the partition, encoding the CTU comprising encoding a transform unit (TU) of the CTU by: updating a replacement variable HistValue for calculating Rice parameters for the TU, wherein updating the replacement variable HistValue is performed independently of (a) another TU of the CTU that precedes the TU and (b) another CTU of the plurality of CTUs that precedes the CTU; calculating the Rice parameters for the TU in the CTU based on the updated replacement variable HistValue; and encoding coefficient values of the TU into a binary representation corresponding to the TU in the CTU based on the calculated Rice parameters; and encoding the binary representation of the partition into a bitstream of the video.

In another example, a non-transitory computer-readable medium having program code that is stored thereon, the program code executable by one or more processing devices for performing operations comprising: accessing a partition of the video, the partition comprising a plurality of coding tree units (CTUs); processing the partition of the video to generate a binary representation of the partition, the processing comprising: encoding each CTU of the plurality of CTUs in the partition, encoding the CTU comprising encoding a transform unit (TU) of the CTU by: updating a replacement variable HistValue for calculating Rice parameters for the TU, wherein updating the replacement variable HistValue is performed independently of another TU of the CTU that precedes the TU and another CTU of the plurality of CTUs that precedes the CTU; calculating the Rice parameters for the TU in the CTU based on the updated replacement variable HistValue; and encoding coefficient values of the TU into a binary representation corresponding to the TU in the CTU based on the calculated Rice parameters; and encoding the binary representation of the partition into a bitstream of the video.

In another example, a system comprising: a processing device; and a non-transitory computer-readable medium communicatively coupled to the processing device, wherein the processing device is configured to execute program code stored in the non-transitory computer-readable medium and thereby perform operations comprising: accessing a partition of the video, the partition comprising a plurality of coding tree units (CTUs); processing the partition of the video to generate a binary representation of the partition, the processing comprising: encoding each CTU of the plurality of CTUs in the partition, encoding the CTU comprising encoding a transform unit (TU) of the CTU by: updating a replacement variable HistValue for calculating Rice parameters for the TU, wherein updating the replacement variable HistValue is performed independently of another TU of the CTU that precedes the TU and another CTU of the plurality of CTUs that precedes the CTU; calculating the Rice parameters for the TU in the CTU based on the updated replacement variable HistValue; and encoding coefficient values of the TU into a binary representation corresponding to the TU in the CTU based on the calculated Rice parameters; and encoding the binary representation of the partition into a bitstream of the video.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 5 depicts an example of a coding block with a pre-determined order for processing the elements of the coding block.

FIG. 7 depicts an example of a process for encoding a partition for a video according to some embodiments of the present disclosure.

FIG. 8 depicts an example of a process for decoding a partition of a video according to some embodiments of the present disclosure.

DETAILED DESCRIPTION

Figure 1:
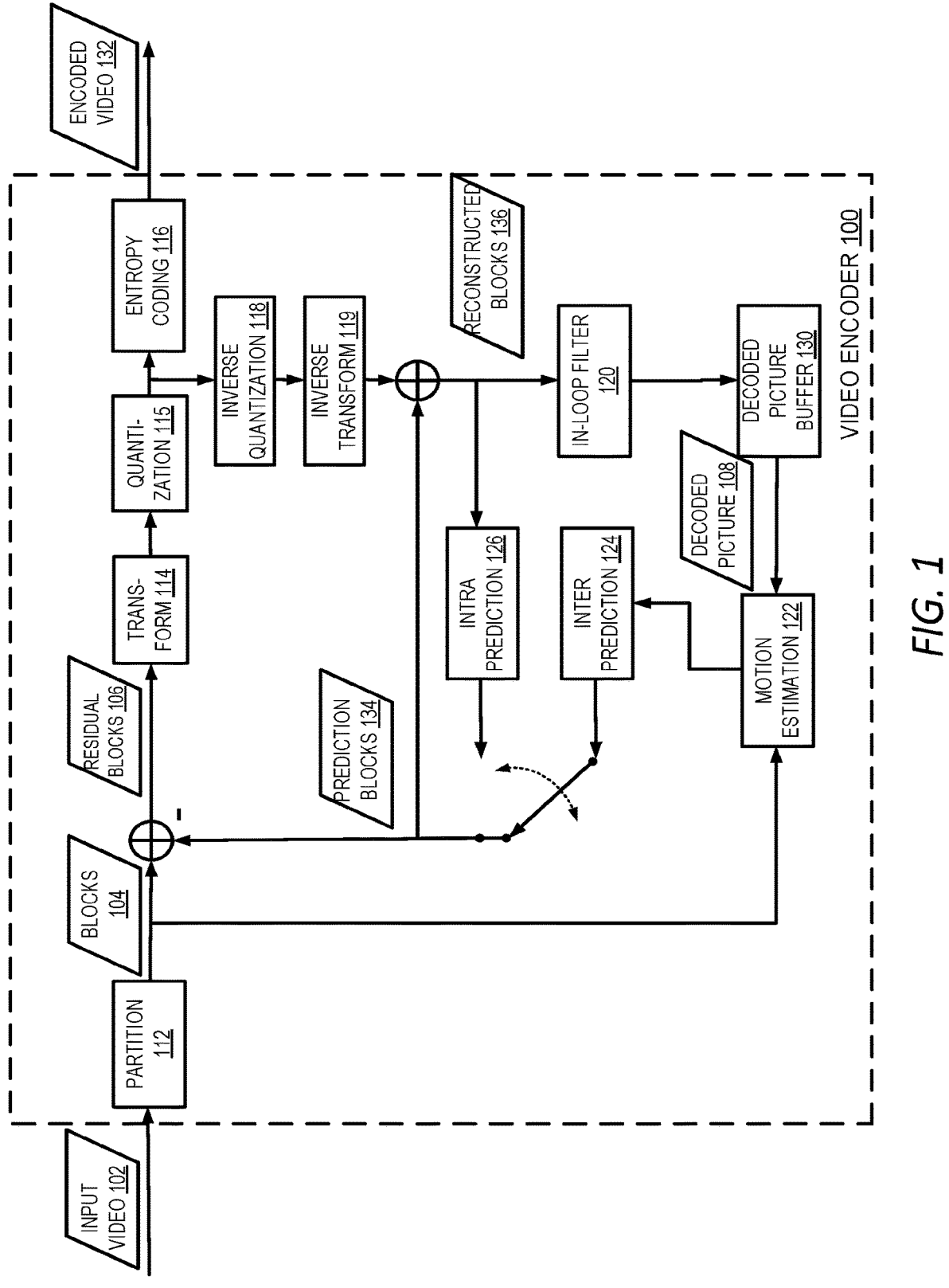
FIG. 1 is a block diagram showing an example of a video encoder configured to implement embodiments presented herein.

Various embodiments provide independent history-based Rice parameter derivations for video coding. As discussed above, more and more video data are being generated, stored, and transmitted. It is beneficial to increase the efficiency of the video coding technology thereby using less data to represent a video without compromising the visual quality of the decoded video. One way to improve coding efficiency is through entropy coding to compress processed video samples into a binary bitstream using as few bits as possible.

In entropy coding, transform coefficient data are binarized to binary bins and coding algorithms such as context-adaptive binary arithmetic coding (CABAC) can further compress bins into bits. The binarization requires the calculation of a binarization parameter, such as the Rice parameter used in a combination of truncated Rice (TR) and limited k-th order Exp-Golomb (EGk) binarization process as specified in the Versatile Video Coding (VVC) specification. To improve the coding efficiency, a method of history-based Rice parameter derivation is used. In this method, the Rice parameter for a transform unit (TU) in a current coding tree unit (CTU) of a partition (e.g., a picture, a slice, or a tile) is derived based on a history counter (denoted as StatCoeff) calculated according to coefficients in previous TUs in the current CTU and previous CTU(s) in the partition. The history counter is then used to derive a replacement variable (denoted as HistValue) to be used to derive the Rice parameter. The history counter may be updated when processing a TU and the update is made based on the previous StatCoeff which is derived from the previous TU in the current CTU or the previous CTU. As a result, the history value used in the derivation of Rice parameters of all scan positions in the current TU is based upon the information of the previous TU. This creates the dependency between the current TU and the previous TU in the current CTU or even the previous CTU in some cases. Such a design is not hardware friendly and may prevent parallel processing of multiple CTUs or TUs.

Various embodiments described herein address these problems by providing independent history-based Rice parameter derivation so that the Rice parameter derivation for each TU is independent of the Rice parameter derivation for other TUs. The following non-limiting examples are provided to introduce some embodiments.

In one embodiment, the history counter StatCoeff is updated for each TU that requires history-based Rice parameter derivation. An initial value for the history counter StatCoeff can be established and the history counter StatCoeff for each TU can be calculated based on the initial history counter value rather than the history counter Stat-Coeff from the previous TU. Once the history counter StatCoeff is updated, the replacement variable HistValue is updated based on the value of the history counter StatCoeff. In this way, the remaining positions within the current TU are coded using the updated history counter StatCoeff and the corresponding updated replacement variable HistValue until the replacement variable HistValue and the history counter StatCoeff are updated again. As a result, the history counter StatCoeff is independent of the history counter StatCoeff of the previous TU. Likewise, the derived replacement variable HistValue is also independent of the replacement variable HistValue from the previous TUs or CTUs.

In another embodiment, the replacement variable HistValue for each TU is updated based on the quantized level of the first non-zero Golomb-Rice coded transform coefficient in TU that is coded as abs_remainder or dec_abs_level. Because the quantized levels of the first non-zero Golomb-Rice coded transform coefficient that is coded as abs_remainder or dec_abs_level in different TUs are independent of each other, the derived replacement variable HistValues are also independent of each other. As a result, the history-based Rice parameter derivation for each TU is independent of the Rice parameter derivation for other TUs.

In a further embodiment, the replacement variable HistValue for each TU is updated based on the first non-zero quantized level in the TU. Because the first non-zero quantized levels in different TUs are independent of each other, the derived replacement variable HistValues are also independent of each other. As a result, the history-based Rice parameter derivation for each TU is independent of the Rice parameter derivation for other TUs. Also, compared with the existing Rice parameter derivation process, the computational complexity involved in updating the replacement variable HistValue based on the first non-zero quantized level is much smaller and thus computing power can be reduced. The updated replacement variable HistValue will be used in the derivation of Rice parameter for the remaining abs_remainder and dec_abs_level syntax elements within the current TU.

Using the Rice parameter determined as discussed above, the video encoder can binarize the prediction residual data (e.g., the quantized transform coefficients of residuals) into binary bins and use entropy coding algorithms to further compress bins into bits to be included in video bitstreams. At the decoder side, the decoder can decode the bitstream back to binary bins and determine the Rice parameter using any method or any combination of methods described above and subsequently determine the coefficients from the binary bins. The coefficients can be further de-quantized and inverse transformed to reconstruct the video blocks for display.

As described herein, some embodiments provide improvements in video coding efficiency and computational efficiency by removing the dependency between the current TU and the previous TU or previous CTU in the history-based Rice parameter derivation. By doing so, parallel processing can be performed among different CTUs or TUs thereby increasing the encoding and decoding speed without compromising the stability of the coding process. In addition, the computational complexity in deriving the history-based Rice parameter can be reduced which further speeds up the process. The techniques can be an effective coding tool in future video coding standards.

Referring now to the drawings, FIG. 1 is a block diagram showing an example of a video encoder 100 configured to implement embodiments presented herein. In the example shown in FIG. 1, the video encoder 100 includes a partition module 112, a transform module 114, a quantization module 115, an inverse quantization module 118, an inverse transform module 119, an in-loop filter module 120, an intra prediction module 126, an inter prediction module 124, a motion estimation module 122, a decoded picture buffer 130, and an entropy coding module 116.

The input to the video encoder 100 is an input video 102 containing a sequence of pictures (also referred to as frames or images). In a block-based video encoder, for each of the pictures, the video encoder 100 employs a partition module 112 to partition the picture into blocks 104, and each block contains multiple pixels. The blocks may be macroblocks, coding tree units, coding units, prediction units, and/or prediction blocks. One picture may include blocks of different sizes and the block partitions of different pictures of the video may also differ. Each block may be encoded using different predictions, such as intra prediction or inter prediction or intra and inter hybrid prediction.

Usually, the first picture of a video signal is an intra-predicted picture, which is encoded using only intra prediction. In the intra prediction mode, a block of a picture is predicted using only data from the same picture. A picture that is intra-predicted can be decoded without information from other pictures. To perform the intra-prediction, the video encoder 100 shown in FIG. 1 can employ the intra prediction module 126. The intra prediction module 126 is configured to use reconstructed samples in reconstructed blocks 136 of neighboring blocks of the same picture to generate an intra-prediction block (the prediction block 134). The intra prediction is performed according to an intra-prediction mode selected for the block. The video encoder 100 then calculates the difference between block 104 and the intra-prediction block 134. This difference is referred to as residual block 106.

To further remove the redundancy from the block, the residual block 106 is transformed by the transform module 114 into a transform domain by applying a transform to the samples in the block. Examples of the transform may include, but are not limited to, a discrete cosine transform (DCT) or discrete sine transform (DST). The transformed values may be referred to as transform coefficients representing the residual block in the transform domain. In some examples, the residual block may be quantized directly without being transformed by the transform module 114. This is referred to as a transform skip mode.

The video encoder 100 can further use the quantization module 115 to quantize the transform coefficients to obtain quantized coefficients. Quantization includes dividing a sample by a quantization step size followed by subsequent rounding, whereas inverse quantization involves multiplying the quantized value by the quantization step size. Such a quantization process is referred to as scalar quantization. Quantization is used to reduce the dynamic range of video samples (transformed or non-transformed) so that fewer bits are used to represent the video samples.

The quantization of coefficients/samples within a block can be done independently and this kind of quantization method is used in some existing video compression standards, such as H.264, and HEVC. For an N-by-M block, a specific scan order may be used to convert the 2D coefficients of a block into a 1-D array for coefficient quantization and coding. Quantization of a coefficient within a block may make use of the scan order information. For example, the quantization of a given coefficient in the block may depend on the status of the previous quantized value along the scan order. In order to further improve the coding efficiency, more than one quantizer may be used. Which quantizer is used for quantizing a current coefficient depends on the information preceding the current coefficient in encoding/decoding scan order. Such a quantization approach is referred to as dependent quantization.

The degree of quantization may be adjusted using the quantization step sizes. For instance, for scalar quantization, different quantization step sizes may be applied to achieve finer or coarser quantization. Smaller quantization step sizes correspond to finer quantization, whereas larger quantization step sizes correspond to coarser quantization. The quantization step size can be indicated by a quantization parameter (QP). The quantization parameters are provided in the encoded bitstream of the video such that the video decoder can apply the same quantization parameters for decoding.

The quantized samples are then coded by the entropy coding module 116 to further reduce the size of the video signal. The entropy encoding module 116 is configured to apply an entropy encoding algorithm to the quantized samples. In some examples, the quantized samples are binarized into binary bins and coding algorithms further compress the binary bins into bits. Examples of the binarization methods include, but are not limited to, truncated Rice (TR) and limited k-th order Exp-Golomb (EGk) binarization. To improve the coding efficiency, a method of history-based Rice parameter derivation is used, where the Rice parameter derived for a transform unit (TU) is based on a variable obtained or updated from previous TUs. Examples of the entropy encoding algorithm include, but are not limited to, a variable length coding (VLC) scheme, a context adaptive VLC scheme (CAVLC), an arithmetic coding scheme, a binarization, a context-adaptive binary arithmetic coding (CABAC), syntax-based context-adaptive binary arithmetic coding (SBAC), probability interval partitioning entropy (PIPE) coding, or other entropy encoding techniques. The entropy-coded data is added to the bitstream of the output encoded video 132.

As discussed above, reconstructed blocks 136 from neighboring blocks are used in the intra-prediction of blocks of a picture. Generating the reconstructed block 136 of a block involves calculating the reconstructed residuals of this block. The reconstructed residual can be determined by applying inverse quantization and inverse transform to the quantized residual of the block. The inverse quantization module 118 is configured to apply the inverse quantization to the quantized samples to obtain de-quantized coefficients. The inverse quantization module 118 applies the inverse of the quantization scheme applied by the quantization module 115 by using the same quantization step size as the quantization module 115. The inverse transform module 119 is configured to apply the inverse transform of the transform applied by the transform module 114 to the de-quantized samples, such as inverse DCT or inverse DST. The output of the inverse transform module 119 is the reconstructed residuals for the block in the pixel domain. The reconstructed residuals can be added to the prediction block 134 of the block to obtain a reconstructed block 136 in the pixel domain. For blocks where the transform is skipped, the inverse transform module 119 is not applied to those blocks. The de-quantized samples are the reconstructed residuals for the blocks.

Blocks in subsequent pictures following the first intra-predicted picture can be coded using either inter prediction or intra prediction. In inter-prediction, the prediction of a block in a picture is from one or more previously encoded video pictures. To perform inter prediction, the video encoder 100 uses an inter prediction module 124. The inter prediction module 124 is configured to perform motion compensation for a block based on the motion estimation provided by the motion estimation module 122.

The motion estimation module 122 compares a current block 104 of the current picture with decoded reference pictures 108 for motion estimation. The decoded reference pictures 108 are stored in a decoded picture buffer 130. The motion estimation module 122 selects a reference block from the decoded reference pictures 108 that best matches the current block. The motion estimation module 122 further identifies an offset between the position (e.g., x, y coordinates) of the reference block and the position of the current block. This offset is referred to as the motion vector (MV) and is provided to the inter prediction module 124. In some cases, multiple reference blocks are identified for the block in multiple decoded reference pictures 108. Therefore, multiple motion vectors are generated and provided to the inter prediction module 124.

The inter prediction module 124 uses the motion vector(s) along with other inter-prediction parameters to perform motion compensation to generate a prediction of the current block, i.e., the inter prediction block 134. For example, based on the motion vector(s), the inter prediction module 124 can locate the prediction block(s) pointed to by the motion vector(s) in the corresponding reference picture(s). If there are more than one prediction block, these prediction blocks are combined with some weights to generate a prediction block 134 for the current block.

For inter-predicted blocks, the video encoder 100 can subtract the inter-prediction block 134 from the block 104 to generate the residual block 106. The residual block 106 can be transformed, quantized, and entropy coded in the same way as the residuals of an intra-predicted block discussed above. Likewise, the reconstructed block 136 of an inter-predicted block can be obtained through inverse quantizing, inverse transforming the residual, and subsequently combining with the corresponding prediction block 134.

To obtain the decoded picture 108 used for motion estimation, the reconstructed block 136 is processed by an in-loop filter module 120. The in-loop filter module 120 is configured to smooth out pixel transitions thereby improving the video quality. The in-loop filter module 120 may be configured to implement one or more in-loop filters, such as a de-blocking filter, or a sample-adaptive offset (SAO) filter, or an adaptive loop filter (ALF), etc.

Figure 2:
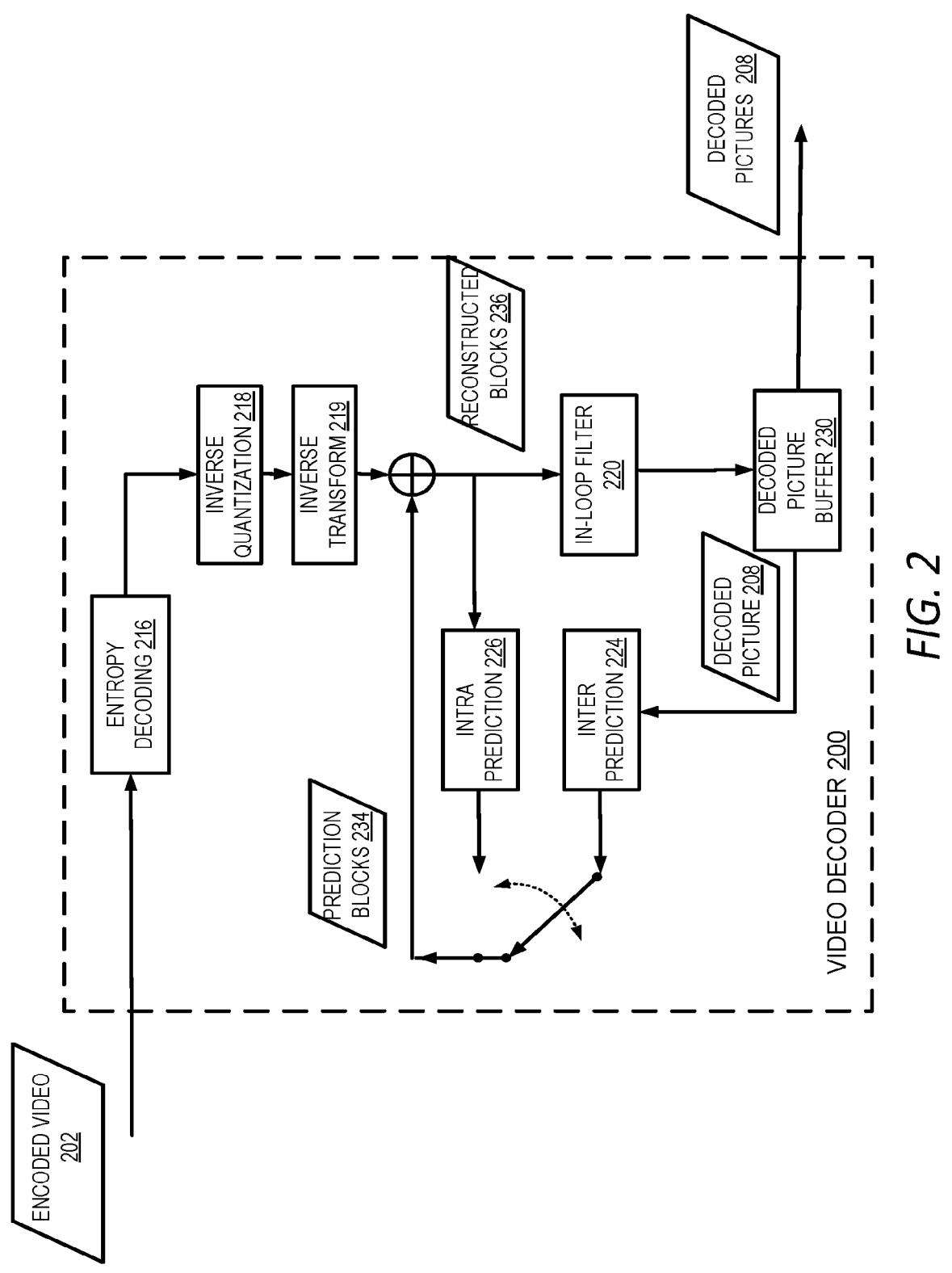
FIG. 2 is a block diagram showing an example of a video decoder configured to implement embodiments presented herein.

FIG. 2 depicts an example of a video decoder 200 configured to implement embodiments presented herein. The video decoder 200 processes an encoded video 202 in a bitstream and generates decoded pictures 208. In the example shown in FIG. 2, the video decoder 200 includes an entropy decoding module 216, an inverse quantization module 218, an inverse transform module 219, an in-loop filter module 220, an intra prediction module 226, an inter prediction module 224, and a decoded picture buffer 230.

The entropy decoding module 216 is configured to perform entropy decoding of the encoded video 202. The entropy decoding module 216 decodes the quantized coefficients, coding parameters including intra prediction parameters and inter prediction parameters, and other information. In some examples, the entropy decoding module 216 decodes the bitstream of the encoded video 202 to binary representations and then converts the binary representations to the quantization levels for the coefficients. The entropy-decoded coefficients are then inverse quantized by the inverse quantization module 218 and subsequently inverse transformed by the inverse transform module 219 to the pixel domain. The inverse quantization module 218 and the inverse transform module 219 function similarly to the inverse quantization module 118 and the inverse transform module 119, respectively, as described above with respect to FIG. 1. The inverse-transformed residual block can be added to the corresponding prediction block 234 to generate a reconstructed block 236. For blocks where the transform is skipped, the inverse transform module 219 is not applied to those blocks. The de-quantized samples generated by the inverse quantization module 118 are used to generate the reconstructed block 236.

The prediction block 234 of a particular block is generated based on the prediction mode of the block. If the coding parameters of the block indicate that the block is intra predicted, the reconstructed block 236 of a reference block in the same picture can be fed into the intra prediction module 226 to generate the prediction block 234 for the block. If the coding parameters of the block indicate that the block is inter-predicted, the prediction block 234 is generated by the inter prediction module 224. The intra prediction module 226 and the inter prediction module 224 function similarly to the intra prediction module 126 and the inter prediction module 124 of FIG. 1, respectively.

As discussed above with respect to FIG. 1, the inter prediction involves one or more reference pictures. The video decoder 200 generates the decoded pictures 208 for the reference pictures by applying the in-loop filter module 220 to the reconstructed blocks of the reference pictures. The decoded pictures 208 are stored in the decoded picture buffer 230 for use by the inter prediction module 224 and also for output.

Figures 3, 4:
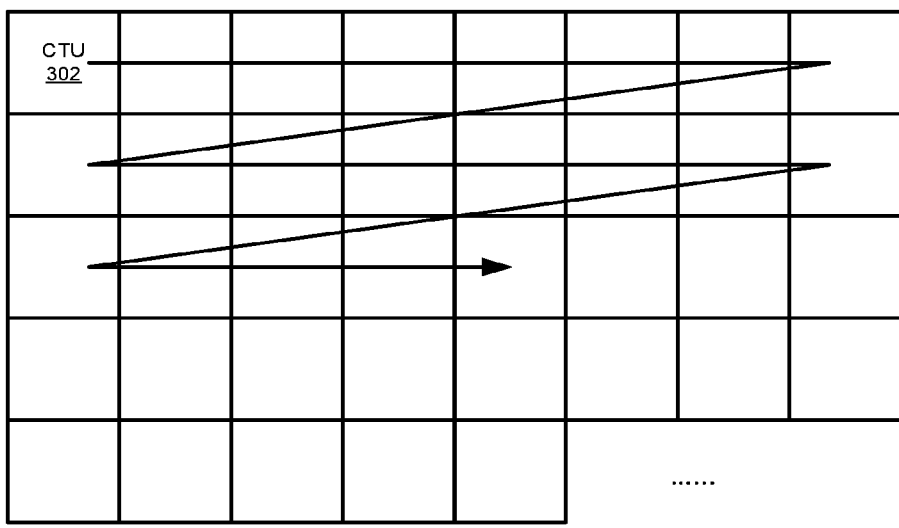
FIG. 3 depicts an example of a coding tree unit division of a picture in a video, according to some embodiments of the present disclosure.
FIG. 4 depicts an example of a coding unit division of a coding tree unit, according to some embodiments of the present disclosure.

Referring now to FIG. 3, FIG. 3 depicts an example of a coding tree unit division of a picture in a video, according to some embodiments of the present disclosure. As discussed above with respect to FIGS. 1 and 2, to encode a picture of a video, the picture is divided into blocks, such as the CTUs (Coding Tree Units) 302 in VVC, as shown in FIG. 3. For example, the CTUs 302 can be blocks of 128×128 pixels. The CTUs are processed according to an order, such as the order shown in FIG. 3. In some examples, each CTU 302 in a picture can be partitioned into one or more CUs (Coding Units) 402 as shown in FIG. 4, which can be further partitioned into prediction units or transform units (TUs) for prediction and transformation. Depending on the coding schemes, a CTU 302 may be partitioned into CUs 402 differently. For example, in VVC, the CUs 402 can be rectangular or square and can be coded without further partitioning into prediction units or transform units. Each CU 402 can be as large as its root CTU 302 or be subdivisions of a root CTU 302 as small as 4×4 blocks. As shown in FIG. 4, a division of a CTU 302 into CUs 402 in VVC can be quadtree splitting or binary tree splitting or ternary tree splitting. In FIG. 4, solid lines indicate quadtree splitting and dashed lines indicate binary or ternary tree splitting.

As discussed above with respect to FIGS. 1 and 2, quantization is used to reduce the dynamic range of elements of blocks in the video signal so that fewer bits are used to represent the video signal. In some examples, before quantization, an element at a specific position of the block is referred to as a coefficient. After quantization, the quantized value of the coefficient is referred to as a quantization level or a level. Quantization typically consists of division by a quantization step size and subsequent rounding while inverse quantization consists of multiplication by the quantization step size. Such a quantization process is also referred to as scalar quantization. The quantization of the coefficients within a block can be performed independently and this kind of independent quantization method is used in some existing video compression standards, such as H.264, HEVC, etc. In other examples, dependent quantization is employed, such as in VVC.

For an N-by-M block, a specific scanning order may be used to convert 2-D coefficients of a block into a 1-D array for coefficient quantization and coding, and the same scanning order is used for both encoding and decoding. FIG. 5 shows an example of a coding block (such as a transform unit (TU)) with a pre-determined scanning order for processing the coefficients of the coding block. In this example, the coding block 500 has a size of 8×8 and the processing starts at the lower right corner at position $L_0$ and ends at the upper left corner $L_{63}$. If block 500 is a transformed block, the pre-determined order shown in FIG. 5 starts from the highest frequency to the lowest frequency. In some examples, the processing of the block, such as quantization and binarization, starts from the first non-zero element of the block according to the pre-determined scanning order. For instance, if the coefficients at locations $L_0$-$L_{17}$ are all zero and the coefficient at $L_{18}$ is non-zero, then the processing starts at the coefficient at $L_{18}$ and is performed for each coefficient after $L_{18}$ in the scanning order.

Residual Coding

Residual coding is used to convert the quantization levels into a bit stream in video coding. After quantization, there are N×M quantization levels for an N×M transform unit (TU) coding block. These N×M levels may be zero or non-zero values. The non-zero levels will further be binarized to binary bins if the levels are not binary. Context-adaptive binary arithmetic coding (CABAC) can further compress bins into bits. Furthermore, there are two kinds of context modeling-based coding methods. In particular, one of the methods updates the context model adaptively according to the neighboring coded information. Such a method is called context coded method, and bins coded in this way are called context coded bins. In contrast, the other method assumes the probability of 1 or 0 is always 50% and therefore always uses a fixed context modeling without adaptation. This kind of method is called as bypass method and bins coded by this method are called bypass bins.

For a regular residual coding (RRC) block in VVC, the position of the last non-zero level is defined as the position of last non-zero level along the coding scanning order. The representation of the 2D coordinates (last_sig_coeff_x and last_sig_coeff_y) of the last non-zero level includes a total of 4 prefix and suffix syntax elements, which are last_sig_coeff_x_prefix, last_sig_coeff_y_prefix, last_sig_coeff_x_suffix, last_sig_coeff_y_suffix. The syntax elements last_sig_coeff_x_prefix and last_sig_coeff_y_prefix are first coded with context coded method. If last_sig_coeff_x_suffix and last_sig_coeff_y_suffix are presented, they are coded with the bypass method. A RRC block may consist of several pre-defined sub-blocks. The syntax element sb_coded_flag is used to indicate if the current sub-block has all the levels equal to zero or not. If sb_coded_flag is equal to 1, there is at least one non-zero coefficient in the current sub-block. If sb_coded_flag is equal to 0, all coefficients in the current sub-block will be zeros. However, the sb_coded_flag for the last non-zero sub-block which has the last non-zero level is derived as 1 from last_sig_coeff_x and last_sig_coeff_y according to the coding scanning order without coding into bitstream. Moreover, the sb_coded_flag for the top-left sub-block which contains the DC position is also derived as 1 without coding into the bitstream. The syntax elements of sb_coded_flag in the bitstream are coded through the context coded method. RRC will code sub-block by sub-block starting from the last non-zero sub-block with a reverse coding scanning order as discussed above with respect to FIG. 5.

In order to guarantee the worst-case throughput, a pre-defined value remBinsPass1 is used to limit the maximum number of context coded bins. Within a sub-block, RRC will code the level of each position with a reverse coding scan order. If remBinsPass1 is greater than 4, when coding the current level, a flag, named as sig_coeff_flag, is first coded into the bitstream to indicate if the level is zero or non-zero. If the level is non-zero, the abs_level_gtx_flag[n][0] where n is the index along the scanning order of the current position within a sub-block to indicate if the absolute level is 1 or greater than 1. If the absolute level is greater than 1, the par_level_flag will be coded to indicate if the level is an odd or even number in VVC and then abs_level_gtx_flag [n][1] will be present. The flags of par_level_flag and abs_level_gtx_flag[n][1] are also used together to indicate the level is 2, or 3 or greater than 3. After coding each of the above syntax elements as a context-coded bin, the value of remBinsPass1 will be decreased by one.

If the absolute level is greater than 3 or the value of remBinsPass1 is not greater than 4, two more syntax elements, abs_remainder and dec_abs_level may be coded as bypass-coded bins for the remaining level after coding the aforementioned bins by the context coded method. In addition, the sign of each level within a block will also be coded to represent the quantization level, and they are coded as bypass-coded bins.

Another residual coding method uses abs_level_gtxX_flag and the remaining level to allow conditionally parsing of the syntax elements for level coding of a residual block, and the corresponding binarization of the absolute value of level is shown in Table 1. Here abs_level_gtxX_flag describes if the absolute value of the level is greater than X where X is an integer number, e.g., 0, 1, 2, or N. If abs_level_gtxY_flag is 0 where Y is an integer between 0 and N−1, abs_level_gtx(Y+1) flag will not be present. If abs_level_gtxY_flag is 1, abs_level_gtx(Y+1) flag will be present. Moreover, if abs_level_gtxN_flag is 0, the remaining level will not be present. When abs_level_gtxN_flag is 1, the remaining level will be present and it represents the value after removing (N+1) from the level. Typically, abs_level_gtxX_flag is coded with context coded method and remaining level is coded with bypass method, respectively.

sub-block when a certain condition occurs. If all the sb_coded_flags are not equal to 1 for all the sub-blocks before the last sub-block, sb_coded_flag will be derived as 1 for the last sub-block and this flag is not coded into the bitstream. In order to guarantee the worst-case throughput, a pre-defined value RemCcbs is used to limit the maximum context coded bins. If the current sub-block has non-zero levels, TSRC will code the level of each position with the coding scan order. If RemCcbs is greater than 4, the following syntax elements will be coded with context coded method. For each level, sig_coeff_flag, is first coded into the bitstream to indicate if the level is zero or non-zero. If the level is non-zero, coeff_sign_flag will be coded to indicate the level is positive or negative. Then abs_level_gtx_flag[n][0] where n is the index along scan order of current position within a sub-block will be coded to indicate if the current absolute level of current position is greater than 1 or not. If abs_level_gtx_flag[n][0] is not zero, par_level_flag will be coded. After coding each above syntax element with context coded method, the value of RemCcbs will be decreased by one.

After coding above syntax elements for all the positions within the current sub-block, if the RemCcbs is still greater than 4, up to four more abs_level_gtx_flag[n][j] where n is the index along the scanning order of current position within a sub-block; j is from 1 to 4 and will be coded with context coded method. The value of RemCcbs will be decreased by one after each abs_level_gtx_flag[n][j] is coded. If RemCcbs is not greater than 4, syntax element abs_remainder will be coded with the bypass method, if necessary, for the current position within a sub-block. For those positions where the absolute levels are fully coded with abs_remainder syntax element through the bypass method, the coeff_sign_flags are also coded by the bypass method. In summary, there is a pre-defined counter remBinsPass1 in RRC or RemCcbs in TSRC to limit the total number of context coded bins and to assure the worst-case throughput.

Rice Parameter Derivation

In the current RRC design in VVC, two syntax elements, abs_remainder and dec_abs_level coded as bypass bins, may be present in the bitstream for the remaining levels. Both abs_remainder and dec_abs_level are binarized through a combination of truncated Rice (TR) and limited k-th order Exp-Golomb (EGk) binarization process as specified in the VVC specification, which requires a Rice parameter to binarize a given level. In order to have an optimal Rice parameter, a local sum method is employed as described in the following.

TABLE 1

| The residual coding based upon abs_level_gtxX_flag and remainder | | | | | | | | | | | | | | |
|---|---|---|---|---|---|---|---|---|---|---|---|---|---|---|
| abs(level) | 0 | 1 | 2 | 3 | 4 | 5 | 6 | 7 | 8 | 9 | 10 | 11 | 12 | ... |
| abs_level_gtx0_flag | 0 | 1 | 1 | 1 | 1 | 1 | 1 | 1 | 1 | 1 | 1 | 1 | 1 | ... |
| abs_level_gtx1_flag | | 0 | 1 | 1 | 1 | 1 | 1 | 1 | 1 | 1 | 1 | 1 | 1 | ... |
| abs_level_gtx2_flag | | | 0 | 1 | 1 | 1 | 1 | 1 | 1 | 1 | 1 | 1 | 1 | ... |
| abs_level_gtx3_flag | | | | 0 | 1 | 1 | 1 | 1 | 1 | 1 | 1 | 1 | 1 | ... |
| remainder | | | | | 0 | 1 | 2 | 3 | 4 | 5 | 6 | 7 | 8 | ... |

For a block coded in the transform skip residual coding mode (TSRC), TSRC will code sub-block by sub-block starting from the top-left sub-block along the coding scan order. Similarly, the syntax element sb_coded_flag is used to indicate if the current sub-block has all the residuals equal to zero or not. All the syntax elements of sb_coded_flag for all sub_blocks are coded into the bitstream except for the last The array AbsLevel[xC][yC] represents an array of absolute values of transform coefficient levels for the current transform block. Given the array AbsLevel[x][y] for the transform block with color component index cIdx and the top-left luma location (x0, y0), a local sum variable locSumAbs is derived as specified by the following pseudo-code process:

```
locSumAbs = 0
if( xC < ( 1 << log2TbWidth ) − 1 ) {
    locSumAbs += AbsLevel[ xC + 1 ][ yC ]
    if( xC < ( 1 << log2TbWidth ) − 2 )
        locSumAbs += AbsLevel[ xC + 2 ][ yC ]
    if( yC < ( 1 << log2TbHeight ) − 1 )
        locSumAbs += AbsLevel[ xC + 1 ][ yC + 1 ]
}
if( yC < ( 1 << log2TbHeight ) − 1 ) {
    locSumAbs += AbsLevel[ xC ][ yC + 1 ]
    if( yC < ( 1 << log2TbHeight ) − 2 )
        locSumAbs += AbsLevel[ xC ][ yC + 2 ]
}
locSumAbs = Clip3( 0, 31, locSumAbs − baseLevel * 5 )
``` where log2TbWidth and log2TbHeight are base-2 logarithm of width and height of transform block, respectively. The variable baseLevel is 4 and 0 for abs_remainder and dec_abs_level, respectively. Given the local sum variable locSumAbs, the Rice parameter cRiceParam is derived as specified in Table 2.

TABLE 2

Specification of cRiceParam based on locSumAbs

| | locSumAbs | | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| cRiceParam | 0 | 0 | 0 | 0 | 0 | 0 | 0 | 1 | 1 | 1 | 1 | 1 | 1 | 1 | 2 | 2 |

| | locSumAbs | | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

History Based Rice Parameter Derivation

Figure 6:
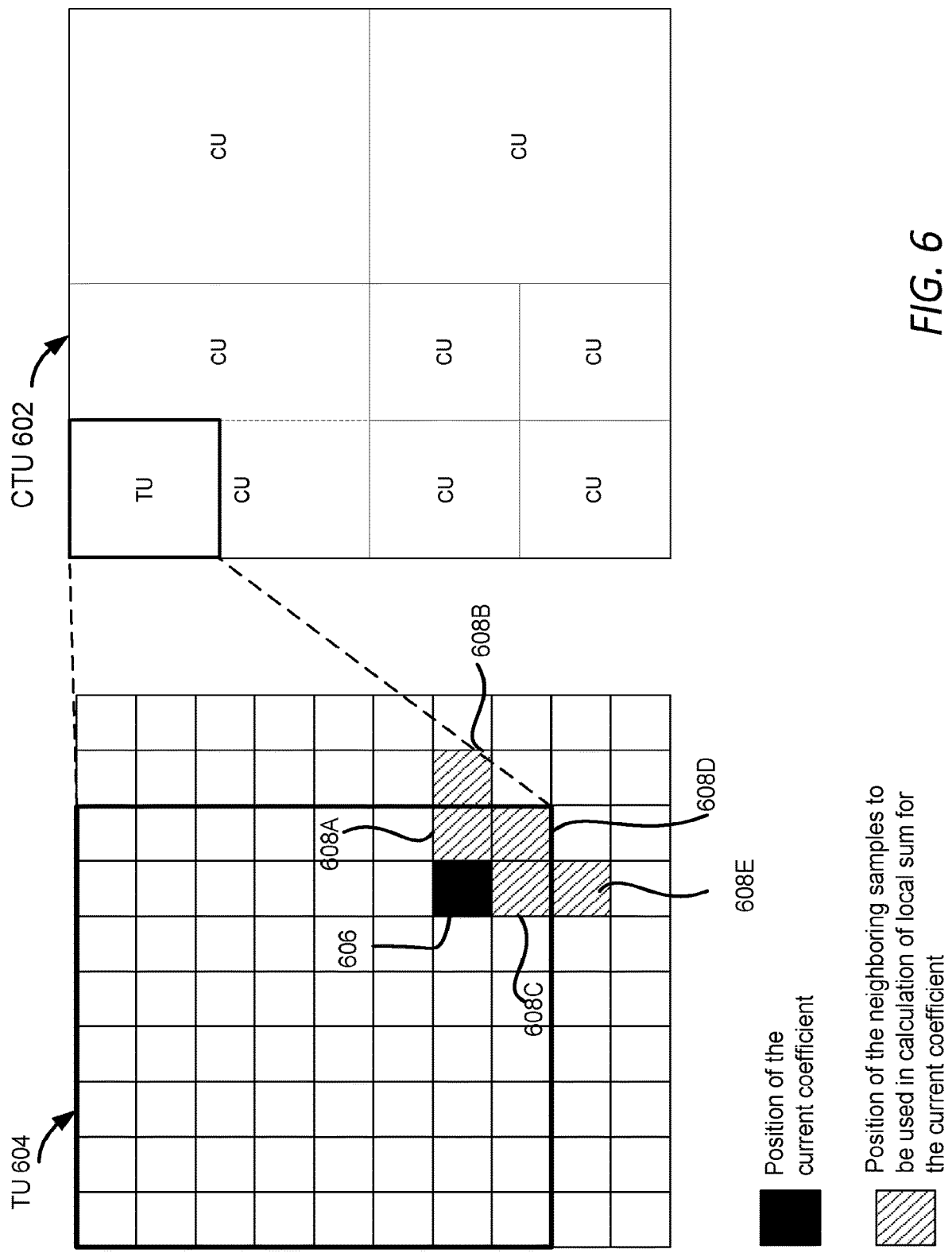
FIG. 6 depicts an example of a template pattern for calculating a local sum variable for a coefficient located near a transform unit boundary.

Template computation employed for the Rice parameter derivation may produce inaccurate estimates of coefficients, if the coefficients are located at the TU boundary, or being first decoded with the Rice method. For those coefficients, the template computation is biased toward 0 because some template positions may be located outside of the TU and interpreted as or initialized to be value 0. FIG. 6 shows an example of a template pattern for calculating the locSumAbs for a coefficient located near the TU boundary. FIG. 6 shows a CTU 602 divided into multiple CUs and each CU includes multiple TUs. For TU 604, the position of the current coefficient is shown in a solid block and positions of its neighboring samples in the template pattern are shown in patterned blocks. The patterned blocks indicate the pre-determined neighborhood of the current coefficient that is used to calculate the local sum variable locSumAbs.

In FIG. 6, because the current coefficient 606 is close to the boundary of TU 604, some of its neighboring samples in the template pattern are outside the TU boundary, such as neighboring samples 608B and 608E. In the Rice parameter derivation described above, these out-of-boundary neighboring samples are set to 0 when calculating the local sum variable locSumAbs, leading to an inaccuracy in the Rice parameter derivation. For high bit depth samples (e.g., more than 10 bits), the neighboring samples outside the TU boundary can be large numbers. Setting these large numbers to 0 will introduce more errors in the Rice parameter derivation.

To improve the accuracy of the Rice parameter estimate from the computed template, it was proposed that for template positions outside the current TU, the local sum variable locSumAbs is updated with a history derived value, instead of 0 initialization. Implementation of this method is shown below by the VVC specification text extract for clause 9.3.3.2, with proposed text being underlined.

To maintain a history of the neighboring coefficient/sample values, a history counter per color component StatCoeff[cIdx] is utilized with cIdx=0, 1, 2 representing three color components Y, U, V, respectively. If the CTU is the first CTU in a partition (e.g., a picture, a slice, or a tile), the StatCoeff[cIdx] is initialized as follows:

$$StatCoeff[idx] = 2 * Floor(\text{Log}2(BitDepth - 10)). \qquad (1)$$

Here, BitDepth specifies the bit depth of the samples of the luma and chroma arrays of a video; Floor(x) represents the largest integer smaller than or equal to x, and Log 2(x) is base-2 logarithm of x. Prior to the TU decoding and history counter update, a replacement variable HistValue is being initialized as:

$$HistValue[cIdx] = 1 << StatCoeff[cIdx]. \qquad (2)$$

The replacement variable HistValue is used as an estimate of the neighboring sample that is outside the TU boundary (e.g., the neighboring sample has a horizontal coordinate or a vertical coordinate outside the TU). The local sum variable locSumAbs is re-derived as specified by the following pseudo-code process with the changes underlined:

```
locSumAbs = 0
if( xC < ( 1 << log2TbWidth ) − 1 ) {
    locSumAbs += AbsLevel[ xC + 1 ][ yC ]
    if( xC < ( 1 << log2TbWidth ) − 2 )
        locSumAbs += AbsLevel[ xC + 2 ][ yC ]
    else
        locSumAbs += HistValue
    if( yC < ( 1 << log2TbHeight ) − 1 )
        locSumAbs += AbsLevel[ xC + 1 ][ yC + 1 ]
    else
        locSumAbs += HistValue
}
else
    locSumAbs += 2 * HistValue
if( yC < ( 1 << log2TbHeight ) − 1 ) {
    locSumAbs += AbsLevel[ xC ][ yC + 1 ]
    if( yC < ( 1 << log2TbHeight ) − 2 )
        locSumAbs += AbsLevel[ xC ][ yC + 2 ]
```

-continued

```
        else
            locSumAbs += HistValue
        }
    else
        locSumAbs += HistValue
```

Before coding each TU, the history value HistValue calculated according to Eqn. (2) is used to derive the Rice parameter for coding the first abs_remainder or dec_abs_level syntax element for each TU if possible.

The history counter StatCoeff is updated once per TU from the first, non-zero, Golomb-Rice coded transform coefficient (abs_remainder[cIdx] or dec_abs_level[cIdx]) through a process of an exponential moving average. When the first, non-zero, Golomb-Rice coded transform coefficient in the TU is coded as abs_remainder, the history counter StatCoeff for color component cIdx is updated as the following:

$$(StatCoeff[cIdx] = (StatCoeff[cIdx] + \tag{3}$$
$$Floor(\text{Log2}(abs\_remainder[cIdx])) + 2) >> 1$$

When the first, non-zero, Golomb-Rice coded transform coefficient in the TU is coded as dec_abs_level, the history counter StatCoeff for color component cIdx is updated as the following:

$$StatCoeff[cIdx] = StatCoeff[cIdx] + \tag{4}$$
$$Floor(\text{Log2}(dec\_abs\_level[cIdx]))) >> 1$$

The updated StatCoeff can be used to calculate the replacement variable HistValue for the next TU according to Eqn. (2) prior to decoding the next TU.

While according to the above, the history counter may be updated when processing a TU and the update is made based on the previous StatCoeff which is derived from the previous TU in the current CTU or previous CTU. As a result, the history value used in the derivation of Rice parameters of all scan positions in the current TU is based upon the information of the previous TU. This creates the dependency between the current TU and the previous TU in the current CTU or even the previous CTU in some cases. Such a design is not hardware friendly and may prevent parallel processing of multiple CTUs or TUs. In this disclosure, embodiments are described to provide independent history-based Rice parameter derivation so that the Rice parameter derivation for each TU is independent of the Rice parameter derivation for other TUs.

Initialization of StatCoff

During the coding, an initial value of the history counter StatCoeff for each color component cIdx, denoted as StatCoff_init[cIdx], is defined. Such a value can be fixed for all frames. Alternatively, or additionally, different types of frame (e.g., I, P, B frame) can have different initial values of StatCoff_init[cIdx]. As an example, StatCoff_init[cIdx] can be defined as:

$$StatCoeff\_init[idx] = 2 * Floor(\text{Log2}(BitDepth - 10)) \tag{5}$$

where BitDepth specifies the bit depth of the samples of the luma or chroma arrays, and Floor(x) represents the largest integer smaller than or equal to x.

In another example, StatCoff_init[cIdx] can be defined as:

$$StatCoeff\_init[idx] = Clip[\text{MIN\_Stat}, \text{MAX\_Stat}, (int)((19 - QP)/6)] - 1 \tag{6}$$

where MIN_Stat, MAX_Stat are two predefined integers, QP is the initial quantization parameter for each slice, and Clip( ) is an operation defined as follows:

$$Clip(x, y, z) = \begin{cases} x & ; & z < x \\ y & ; & z > y \\ z & ; & \text{otherwise} \end{cases} \tag{7}$$

Each slice may also have individual StatCoff_init for each color component and specify it at slice header. An example syntax change is shown as follows as underlined:

7.3.7 Slice Header Syntax

|  | Descriptor |
|---|---|
| slice_header( ) { | |
|   sh_picture_header_in_slice_header_flag | u(1) |
|   ..... | |
|   if( sps_transform_skip_enabled_flag && !sh_dep_quant_used_flag && | |
|     !sh_sign_data_hiding_used_flag ) | |
|     sh_ts_residual_coding_disabled_flag | u(1) |
|   if( !sh_ts_residual_coding_disabled_flag && | |
|     sps_ts_residual_coding_rice_present_in_sh_flag ) | |
|     sh_ts_residual_coding_rice_idx_minus1 | u(3) |
|   if( sps_reverse_last_sig_coeff_enabled_flag ) | |
|     sh_reverse_last_sig_coeff_flag | u(1) |
|   <u>if(sps persistent rice adaptation enabled flag ){</u> | |
|     <u>for( i = 0; i < 3; i++ )</u> | |
|       <u>statCoeff_init[ i ]</u> | <u>u(3)</u> |
|   <u>}</u> | |
|   if( pps_slice_header_extension_present_flag ) { | |
|     sh_slice_header_extension_length | ue(v) |
|     for( i = 0; i < sh_slice_header_extension_length; i++) | |

-continued

| | Descriptor |
|---|---|
| sh_slice_header_extension_data_byte[ i ] | u(8) |
| } | |
| if( NumEntryPoints > 0 ) { | |
| sh_entry_offset_len_minus1 | ue(v) |
| for( i = 0; i < NumEntryPoints; i++ ) | |
| sh_entry_point_offset_minus1[ i ] | u(v) |
| } | |
| byte_alignment( ) | |
| } | | statCoeff_init specifies the value used for calculating HistValue used for the residual coding( ) syntax structure in the current slice. When not present, the value of statCoeff_init is inferred to be equal to 0.

Before coding each TU, the history value HistValue is calculated according to Eqn. (8). The calculated history value is used to derive the Rice parameter for coding the first abs_remainder or dec_abs_level syntax element for each TU if possible. In another example, if the last significant coefficient (e.g., last non-zero coefficient) in a TU has abs_remainder[ ] part in its level coding, the calculated history value may be used to derive the Rice parameter for coding the remaining level of the last significant coefficient.

$$HistValue = 1 << StatCoeff\_init[cIdx] \quad (8)$$

While in the above example, StatCoeff_init[cIdx] is defined for each slice in the slice header, it can be defined for other types of partition, such as a frame or a tile.

Update of StatCoeff

In one embodiment, the history counter StatCoeff is updated for each TU that requires history-based Rice parameter derivation based on the initial history counter value StatCoeff_init rather than the history counter StatCoeff from the previous TU. Once the history counter StatCoeff is updated, the replacement variable HistValue is updated based on the value of the history counter StatCoeff. In this way, the remaining positions within the current TU are coded using the updated history counter StatCoeff and the corresponding updated replacement variable HistValue until the replacement variable HistValue and the history counter StatCoeff are updated again. As a result, the history counter StatCoeff is independent of the history counter StatCoeff of the previous TU. Likewise, the derived replacement variable HistValue is also independent of the replacement variable HistValue from the previous TUs or CTUs.

In this embodiment, when the first, non-zero, Golomb-Rice coded transform coefficient in TU is coded as abs_remainder, the history counter for color component cIdx is updated as following:

$$StatCoeff[cIdx] = \quad (9)$$
$$(StatCoeff\_init[cIdx] + Floor(Log2(abs\_remainder[cIdx])) + 2 >> 1$$

When the first, non-zero, Golomb-Rice coded transform coefficient in TU is coded as dec_abs_level, the history counter for color component cIdx is updated as the following:

$$StatCoeff[cIdx] = \quad (10)$$
$$(StatCoeff\_init[cIdx] + Floor(Log2(dec\_abs\_level[cIdx]))) >> 1$$

Once the history counter StatCoeff[cIdx] is updated, the HistValue will be updated conjunctionally according to Eqn. (2) and the updated HistValue will be used in the derivation of Rice parameters for remaining abs_remainder and dec_abs_level syntax elements till the new StatCoeff[cIdx] and HistValue are updated again.

Example changes to the VVC specification are specified as follows.

Change Clause 7.3.11.11 (Residual Coding Syntax) as Follows (Additions are Underlined):

| | Descriptor |
|---|---|
| residual_coding( x0, y0, log2TbWidth, log2TbHeight, cIdx ) { | |
| ... | |
| } | |
| ... | |
| numSbCoeff = 1 << ( log2SbW + log2SbH ) | |
| lastScanPos = numSbCoeff | |
| lastSubBlock = ( | |
| 1 << ( log2TbWidth + log2TbHeight − ( log2SbW + log2SbH ) ) ) − 1 | |
| HistValue = sps_persistent_rice_adaptation_enabled_flag ? | |
| (1 << StatCoeff_init[ cIdx ] ) : 0 | |
| updateHist = sps_persistent_rice_adaptation_enabled_flag ? 1 : 0 | |
| ... | |
| for( n = firstPosMode0; n > firstPosMode1; n− − ) { | |
| xC = ( xS << log2SbW ) + | |
| DiagScanOrder[ log2SbW ][ log2SbH ][ n ][ 0 ] | |
| yC = (yS << log2SbH ) + | |
| DiagScanOrder[ log2SbW ][ log2SbH ][ n ][ 1 ] | |
| if( abs_level_gtx_flag[ n ][ 1 ] ) { | |

-continued

| | Descriptor |
|---|---|
| abs_remainder[ n ] | ae(v) |

```
        abs_remainder[ n ]                                            ae(v)
        if( updateHist && abs_remainder[ n ] > 0 ) {
          StatCoeff[ cIdx ] = ( StatCoeff_init[ cIdx ] +
            Floor( Log2( abs_remainder[ n ] ) ) + 2 ) >> 1
          updateHist = 0
          HistValue = 1 << StatCoeff[ cIdx ]
        }
      }
    AbsLevel[ xC ][ yC ] = AbsLevelPass1[ xC ][ yC ]
+2 * abs_remainder[ n ]
    }
  for( n = firstPosMode1; n >= 0; n- - ) {
    xC = (xS << log2SbW ) +
DiagScanOrder[ log2SbW ][ log2SbH ][ n ][ 0 ]
    yC = ( yS << log2SbH ) +
DiagScanOrder[ log2SbW ][ log2SbH ][ n ][ 1 ]
    if( sb_coded_flag[ xS ][ yS ] ) {
      dec_abs_level[ n ]                                               ae(v)
      if( updateHist && dec_abs_level[ n ] > 0 ) {
        StatCoeff[ cIdx ] = ( StatCoeff_init[ cIdx ] +
          Floor( Log2( dec_abs_level[ n ] ) ) ) >> 1
        updateHist = 0
        HistValue = 1 << StatCoeff[ cIdx ]
      }
    }
    if( AbsLevel[ xC ][ yC ] > 0 ) {
      if( lastSigScanPosSb = = −1 )
        lastSigScanPosSb = n
      firstSigScanPosSb = n
    }
    if( sh_dep_quant_used_flag )
      QState = QStateTransTable[ QState ][ AbsLevel[ xC ][ yC ] & 1 ]
  }
  .......
```

In another embodiment, the replacement variable HistValue for each TU is updated based on the quantized level of the first non-zero Golomb-Rice coded transform coefficient in the TU that is coded as abs_remainder or dec_abs_level. Because the quantized levels of the first non-zero Golomb-Rice coded transform coefficient that is coded as abs_remainder or dec_abs_level in different TUs are independent of each other, the derived replacement variable HistValues are also independent of each other. As a result, the history-based Rice parameter derivation for each TU is independent of the Rice parameter derivation for other TUs.

In this embodiment, when the first non-zero Golomb-Rice coded transform coefficient in TU is coded as abs_remainder or dec_abs_level, the HistValue will be updated based on the quantized level of the transform coefficient according to Eqn. (11) and the updated HistValue will be used in the derivation of Rice parameter for remaining abs_remainder and dec_abs_level syntax elements, $$HistValue = abs(level) \qquad (11)$$

where abs(x) represents the absolute value of x, level is the quantized level at the current position (i.e., the quantized level of the first non-zero Golomb-Rice coded transform coefficient in the TU that is coded as abs_remainder or dec_abs_level).

Example changes to VVC specification are specified as follows.

Change Clause 7.3.11.11 (Residual Coding Syntax) as Follows (Additions are Underlined and Removals are Shown in Strikethrough):

| | Descriptor |
|---|---|

```
residual_coding( x0, y0, log2TbWidth, log2TbHeight, cIdx ) {
    ...
    }
  ...
  numSbCoeff = 1 << ( log2SbW + log2SbH )
  lastScanPos = numSbCoeff
  lastSubBlock = (
1 << ( log2TbWidth + log2TbHeight − ( log2SbW + log2SbH ) ) ) − 1
  HistValue = sps_persistent_rice_adaptation_enabled_flag ?
( 1 << StatCoeff_init[ cIdx ] ) : 0
  updateHist = sps_persistent_rice_adaptation_enabled_flag ? 1 : 0
  ...
      for( n = firstPosMode0; n > firstPosMode1; n- - ) {
        xC = (xS << log2SbW ) +
DiagScanOrder[ log2SbW ][ log2SbH ][ n ][ 0 ]
```

|  | Descriptor |
|---|---|
| yC = ( yS << log2SbH ) + DiagScanOrder[ log2SbW ][ log2SbH ][ n ][ 1 ] | |
| if( abs_level_gtx_flag[ n ][ 1 ] ) { | |
| abs_remainder[ n ] | ae(v) |
| ~~if( updateHist && abs_remainder[ n ] > 0 ) {~~ | |
| ~~StatCoeff[ cIdx ] = ( StatCoeff[ cIdx ] +~~ | |
| ~~Floor( Log2( abs_remainder[ n ] ) ) + 2 ) >> 1~~ | |
| ~~updateHist = 0~~ | |
| ~~}~~ | |
| } | |
| AbsLevel[ xC ][ yC ] = AbsLevelPass1[ xC ][ yC ] +2 * abs_remainder[ n ] | |
| if( updateHist && abs_remainder[ n ] > 0 ) { | |
| updateHist = 0 | |
| HistValue = AbsLevel[ xC ][ yC ] | |
| } | |
| } | |
| for( n = firstPosMode1; n >= 0; n- - ) { | |
| xC = ( xS << log2SbW ) + | |
| DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( sb_coded_flag[ xS ][ yS ] ) { | |
| dec_abs_level[ n ] | ae(v) |
| ~~if( updateHist && dec_abs_level[ n ] > 0 ) {~~ | |
| ~~StatCoeff[ cIdx ] = ( StatCoeff[ cIdx ] +~~ | |
| ~~Floor( Log2( dec_abs_level[ n ] ) ) ) >> 1~~ | |
| ~~updateHist = 0~~ | |
| ~~}~~ | |
| } | |
| if( updateHist && dec_abs_level[ n ] > 0 ) { | |
| updateHist = 0 | |
| HistValue = AbsLevel[ xC ][ yC ] | |
| } | |
| if( AbsLevel[ xC ][ yC ] > 0 ) { | |
| if( lastSigScanPosSb = = −1 ) | |
| lastSigScanPosSb = n | |
| firstSigScanPosSb = n | |
| } | |
| if( sh_dep_quant_used_flag ) | |
| QState = QStateTransTable[ QState ][ AbsLevel[ xC ][ yC ] & 1 ] | |
| } | |
| ....... | |

In a further embodiment, the replacement variable HistValue for each TU is updated based on the first non-zero quantized level in the TU. Because the first non-zero quantized levels in different TUs are independent of each other, the derived replacement variable HistValues are also independent of each other. As a result, the history-based Rice parameter derivation for each TU is independent of the Rice parameter derivation for other TUs. Further, because the last significant coefficient (the first non-zero coefficient to be coded) in the TU is closer to the boundary of the TU, it is a better estimate of the neighboring coefficient values outside the TU boundary as shown in FIG. 6. Using the quantized level of the last significant coefficient as the HistValue can thus provide a better estimate for the out-of-boundary neighboring coefficient which leads to a more accurate estimate of the Rice parameter.

In this embodiment, after the last significant coefficient (the first non-zero quantized level, level) in TU is coded, the HistValue will be updated with the absolute level of last significant coefficient as shown in Eqn. (12) and the updated HistValue will be used in the derivation of Rice parameter for remaining abs_remainder and dec_abs_level syntax elements within the current TU.

$$HistValue = \text{abs}(level) \tag{12}$$

where abs(x) represent the absolute value of x.

Example changes to VVC specification are specified as follows.

Change Clause 7.3.11.11 (Residual Coding Syntax) as Follows (Additions are Underlined and Removals are Shown in Strikethrough):

|  | Descriptor |
|---|---|
| residual_coding( x0, y0, log2TbWidth, log2TbHeight, cIdx ) { | |
| ... | |
| } | |
| ... | |
| numSbCoeff = 1 << ( log2SbW + log2SbH ) | |
| lastScanPos = numSbCoeff | |
| lastSubBlock = ( | |
| 1 << ( log2TbWidth + log2TbHeight − ( log2SbW + log2SbH ) ) ) − 1 | |

-continued

|  | Descriptor |
|---|---|
| HistValue = sps_persistent_rice_adaptation_enabled_flag ? ( 1 << StatCoeff_init[ cIdx ] ) : 0 |  |
| ~~updateHist = sps_persistent_rice_adaptation_enabled_ flag ? 1 : 0~~ |  |
| ... |  |
|     for( n = firstPosMode0; n > firstPosMode1; n− − ) { |  |
|         xC = (xS << log2SbW ) + |  |
| DiagScanOrder[ log2SbW ][ log2SbH ][ n ][ 0 ] |  |
|         yC = (yS << log2SbH ) + |  |
| DiagScanOrder[ log2SbW ][ log2SbH ][ n ][ 1 ] |  |
|         if( abs_level_gtx_flag[ n ][ 1 ] ) { |  |
|             abs_remainder[ n ] | ae(v) |
| ~~if( updateHist && abs_remainder[ n ] > 0 ) {~~ |  |
| ~~StatCoeff[ cIdx ] = ( StatCoeff[ cIdx ] +~~ |  |
| ~~Floor( Log2( abs_ remainder[ n ] ) ) + 2 ) >> 1~~ |  |
| ~~updateHist = 0~~ |  |
|             } |  |
|         } |  |
|     AbsLevel[ xC ][ yC ] = AbsLevelPass1[ xC ][ yC ] +2 * abs_remainder[ n ] |  |
|         if(sps_persistent_rice_adaptation_enabled_flag && (n == lastScanPos)){ |  |
|             HistValue = AbsLevel[ xC ][ yC ] |  |
|         } |  |
|     } |  |
|     for( n = firstPosMode1; n >= 0; n− − ) { |  |
|         xC = ( xS << log2SbW ) + |  |
| DiagScanOrder[ log2SbW ][ log2SbH ][ n ][ 0 ] |  |
|         yC = ( yS << log2SbH ) + |  |
| DiagScanOrder[ log2SbW ][ log2SbH ][ n ][ 1 ] |  |
|         if( sb_coded_flag[ xS ][ yS ] ) { |  |
|             dec_abs_level[ n ] | ae(v) |
| ~~if( updateHist && dec_abs_level[ n ] > 0 ) {~~ |  |
| ~~StatCoeff[ cIdx ] = ( StatCoeff[ cIdx ] +~~ |  |
| ~~Floor( Log2( dec_abs_level[ n ] ) ) ) >> 1~~ |  |
| ~~updateHist = 0~~ |  |
| ~~}~~ |  |
|         } |  |
|         if( AbsLevel[ xC ][ yC ] > 0 ) { |  |
|             if( lastSigScanPosSb = = −1 ) |  |
|               lastSigScanPosSb = n |  |
|             firstSigScanPosSb = n |  |
|         } |  |
|         if( sh_dep_quant_used_flag ) |  |
|             QState = QStateTransTable[ QState ][ AbsLevel[ xC ][ yC ] & 1 ] |  |
|     } |  |
|     ....... |  |

In this example, the replacement variable HistValue is updated in response to determining that the Rice parameter derivation is enabled (indicated by sps_persistent_rice_adaptation_enabled_flag) and that the current position is the last significant coefficient. The flag updateHist is no longer needed and thus can be removed.

In another example, changes to the VVC specification can be made as follows:

Change Clause 7.3.11.11 (Residual Coding Syntax) as Follows (Additions are Underlined and Removals are Shown in Strikethrough):

|  | Descriptor |
|---|---|
| residual_coding( x0, y0, log2TbWidth, log2TbHeight, cIdx ) { |  |
|     ... |  |
|       } |  |
|     ... |  |
|     numSbCoeff = 1 << ( log2SbW + log2SbH ) |  |
|     lastScanPos = numSbCoeff |  |
|     lastSubBlock = ( |  |
| 1 << ( log2TbWidth + log2TbHeight − (log2SbW + log2SbH ) ) ) − 1 |  |
|     HistValue = sps_persistent_rice_adaptation_enabled_flag ? (1 << StatCoeff_init[ cIdx ] ) : 0 |  |
|     updateHist = sps_persistent_rice_adaptation_enabled_flag ? 1 : 0 |  |
|     ... |  |
|         for( n = firstPosMode0; n > firstPosMode1; n− − ) { |  |
|             xC = (xS << log2SbW ) + |  |
| DiagScanOrder[ log2SbW ][ log2SbH ][ n ][ 0 ] |  |
|             yC = (yS << log2SbH ) + |  |

-continued

| | Descriptor |
|---|---|
| DiagScanOrder[ log2SbW ][ log2SbH ][ n ][ 1 ]<br>    if( abs_level_gtx_flag[ n ][ 1 ] ) {<br>       abs_remainder[ n ]<br>~~      if( updateHist && abs_remainder[ n ] > 0 ) {~~<br>~~        StatCoeff[ cIdx ] = ( StatCoeff[ cIdx ] +~~<br>~~         Floor( Log2( abs_remainder[ n ] ) ) + 2 ) >> 1~~<br>~~        updateHist = 0~~<br>~~      }~~<br>    }<br>    AbsLevel[ xC ][ yC ] = AbsLevelPass1[ xC ][ yC ]<br>+2 * abs_remainder[ n ]<br>    if(updateHist){<br>       HistValue = AbsLevel[ xC ][ yC ]<br>       updateHist = 0<br>    }<br>  }<br>  for( n = firstPosMode1; n >= 0; n- - ) {<br>    xC = (xS << log2SbW ) +<br>DiagScanOrder[ log2SbW ][ log2SbH ][ n ][ 0 ]<br>    yC = ( yS << log2SbH ) +<br>DiagScanOrder[ log2SbW ][ log2SbH ][ n ][ 1 ]<br>    if( sb_coded_flag[ xS ][ yS ] ) {<br>      dec_abs_level[ n ]<br>~~      if( updateHist && dec_abs_level[ n ] > 0 ) {~~<br>~~       StatCoeff[ cIdx ] = ( StatCoeff[ cIdx ] +~~<br>~~        Floor( Log2( dec_abs_level[ n ] ) ) ) >> 1~~<br>~~       updateHist = 0~~<br>~~      }~~<br>    }<br>    if( AbsLevel[ xC ][ yC ] > 0 ) {<br>      if( lastSigScanPosSb = = −1 )<br>       lastSigScanPosSb = n<br>      firstSigScanPosSb = n<br>    }<br>    if( sh_dep_quant_used_flag )<br>      QState = QStateTransTable[ QState ][ AbsLevel[ xC ][ yC ] & 1 ]<br>  }<br>  ....... | ae(v)<br><br><br><br><br><br><br><br><br><br><br><br><br><br><br><br><br><br><br>ae(v) |

In this example, the replacement variable HistValue is updated in response to determining that the flag updateHist indicates that the replacement variable HistValue has not 40 been updated (e.g., having a value 1). After the HistValue is updated, the flag updateHist is changed to 0 to indicate that the replacement variable HistValue for this TU has been updated so that HistValue does not need to be updated again for the TU.

In a further example, changes to the VVC specification can be made as follows:

Change Clause 7.3.11.11 (Residual Coding Syntax) as Follows (Additions are Underlined and Removals are Shown in Strikethrough):

| | Descriptor |
|---|---|
| residual_coding( x0, y0, log2TbWidth, log2TbHeight, cIdx ) {<br>  ...<br>    }<br>  ...<br>  numSbCoeff = 1 << ( log2SbW + log2SbH )<br>  lastScanPos = numSbCoeff<br>  lastSubBlock = (<br>1 << ( log2TbWidth + log2TbHeight − (log2SbW + log2SbH ) ) ) − 1<br>~~  HistValue = sps_persistent_rice_adaptation_enabled_flag ?~~<br>~~( 1 << StatCoeff[ cIdx ] ) : 0~~<br>  updateHist = sps_persistent_rice_adaptation_enabled_flag ? 1 : 0<br>  ...<br>    for( n = firstPosMode0; n > firstPosMode1; n- - ) {<br>      xC = (xS << log2SbW ) +<br>DiagScanOrder[ log2SbW ][ log2SbH ][ n ][ 0 ]<br>      yC = ( yS << log2SbH ) +<br>DiagScanOrder[ log2SbW ][ log2SbH ][ n ][ 1 ]<br>      if( abs_level_gtx_flag[ n ][ 1 ] ) {<br>        abs_remainder[ n ]<br>~~        if( updateHist && abs_remainder[ n ] > 0 ) {~~<br>~~         StatCoeff[ cIdx ] = ( StatCoeff[ cIdx ] +~~ | <br><br><br><br><br><br><br><br><br><br><br><br><br><br><br><br><br><br><br><br><br>ae(v) |

-continued

| | Descriptor |
|---|---|
| ~~Floor( Log2( abs_remainder[ n ] ) ) + 2 ) >> 1~~ | |
| ~~updateHist = 0~~ | |
| } | |
| } | |
| AbsLevel[ xC ][ yC ] = AbsLevelPass1[ xC ][ yC ] | |
| +2 * abs_remainder[ n ] | |
| if(updateHist){ | |
| HistValue = AbsLevel[ xC ][ yC ] | |
| updateHist = 0 | |
| } | |
| } | |
| for( n = firstPosMode1; n >= 0; n− − ) { | |
| xC = (xS << log2SbW ) + | |
| DiagScanOrder[ log2SbW ][ log2SbH ][ n ][ 0 ] | |
| yC = ( yS << log2SbH ) + | |
| DiagScanOrder[ log2SbW ][ log2SbH ][ n ][ 1 ] | |
| if( sb_coded_flag[ xS ][ yS ] ) { | |
| dec_abs_level[ n ] | ae(v) |
| ~~if( updateHist && dec_abs_level[ n ] > 0 ) {~~ | |
| ~~StatCoeff[ cIdx ] = ( StatCoeff[ cIdx ] +~~ | |
| ~~Floor( Log2( dec_abs_level[ n ] ) ) ) >> 1~~ | |
| ~~updateHist = 0~~ | |
| ~~}~~ | |
| } | |
| if( AbsLevel[ xC ][ yC ] > 0 ) { | |
| if( lastSigScanPosSb = = −1 ) | |
| lastSigScanPosSb = n | |
| firstSigScanPosSb = n | |
| } | |
| if( sh_dep_quant_used_flag ) | |
| QState = QStateTransTable[ QState ][ AbsLevel[ xC ][ yC ] & 1 ] | |
| } | |
| } | |
| ....... | |

In this example, an initial value for the replacement variable HistValue is calculated for the whole partition (e.g., a slice, a frame, or a tile) as follows:

$$HistValue = sps\_persistent\_rice\_adaptation\_enabled\_flag? 1 << \tag{13}$$

$$statCoeff\_init[cIdx]: 0$$

Before coding each TU, the initial history value may be used to derive the Rice parameter for coding the first abs_remainder or dec_abs_level syntax element for each TU if possible. In another case, if the last significant coefficient in a TU has abs_remainder[ ] part in its level coding, the calculated history value may be used to derive the Rice parameter for coding the remaining level of the last significant coefficient. Since the initial value of the replacement variable HistValue is defined at the partition level, there is no need to initialize it for each TU. The initialization of the HistValue in the above table is therefore removed.

As can be seen from the above examples of this embodiment, by updating the HistValue based on the first non-zero quantized level in the TU, the calculation and update of the history counter StatCoeff can be eliminated thereby reducing the computational complexity of the coding process.

FIG. 7 depicts an example of a process 700 for encoding a partition for a video, according to some embodiments of the present disclosure. One or more computing devices (e.g., the computing device implementing the video encoder 100) implement operations depicted in FIG. 7 by executing suitable program code (e.g., the program code implementing the entropy coding module 116). For illustrative purposes, the process 700 is described with reference to some examples depicted in the figures. Other implementations, however, are possible.

At block 702, the process 700 involves accessing a partition of a video signal. The partition can be a video frame, a slice, or a tile or any type of partition processed by a video encoder as a unit when performing the encoding. The partition includes a set of CTUs. Each CTU includes one or more CUs, and each CU includes multiple TUs for encoding as shown in the example of FIG. 6.

At block 704, which includes 706-712, the process 700 involves processing each CTU of the set of CTUs in the partition to encode the partition into bits. At block 706, the process 700 involves updating the replacement variable HistValue for a TU in the CTU independently of the previous TU or CTU. As discussed above, in some embodiments, updating the replacement variable HistValue can be performed whenever the history counter StatCoeff is updated. For example, updating the history counter StatCoeff is performed according to Eqn. (9) and Eqn. (10) when the first, non-zero, Golomb-Rice coded transform coefficient in a TU is coded as abs_remainder and dec_abs_level, respectively.

In another embodiment, updating the replacement variable HistValue can be based on the first non-zero Golomb-Rice coded transform coefficient in the TU that is coded as abs_remainder or dec_abs_level. The HistValue can be updated based on the quantized level of the transform coefficient according to Eqn. (11) and the updated HistValue will be used in the derivation of Rice parameter for remaining abs_remainder and dec_abs_level syntax elements. In further embodiments, the HistValue is updated with the absolute level of last significant coefficient of the TU as shown in Eqn. (12) and the updated HistValue will be used in the derivation of Rice parameter for remaining abs_remainder and dec_abs_level syntax elements within the current TU.

At block 708, the Rice parameters for the TUs in the CTU are calculated as discussed above based on the updated replacement variable HistValue. At block 710, the process 700 involves encoding the TUs in the CTU into binary representation based on the calculated Rice parameters, such as through a combination of truncated Rice (TR) and limited k-th order EGK as specified in the VVC specification. At block 712, the process 700 involves encoding the binary representation of the CTU into the bits for inclusion in the bitstream of the video. The encoding can be performed, for example, using the context-adaptive binary arithmetic coding (CABAC) discussed above. At block 714, the process 700 involves outputting the encoded video bitstream.

FIG. 8 depicts an example of a process 800 for decoding a partition for a video, according to some embodiments of the present disclosure. One or more computing devices implement operations depicted in FIG. 8 by executing suitable program code. For example, a computing device implementing the video decoder 200 may implement the operations depicted in FIG. 8 by executing the program code for the entropy decoding module 216, the inverse quantization module 218, and the inverse transform module 219. For illustrative purposes, the process 800 is described with reference to some examples depicted in the figures. Other implementations, however, are possible.

At block 802, the process 800 involves accessing a binary string or a binary representation that represents a partition of a video signal. The partition can be a video frame, a slice, or a tile or any type of partition processed by a video encoder as a unit when performing the encoding. The partition includes a set of CTUs. Each CTU includes one or more CUs and each CU includes multiple TUs for encoding as shown in the example of FIG. 6.

At block 804, which includes 806-812, the process 800 involves processing the binary string for each CTU of the set of CTUs in the partition to generate decoded samples for the partition. At block 806, the process 800 involves updating the replacement variable HistValue for a TU in the CTU independently of the previous TU or CTU. As discussed above, in some embodiments, updating the replacement variable HistValue can be performed whenever the history counter StatCoeff is updated. For example, updating the history counter StatCoeff is performed according to Eqn. (9) and Eqn. (10) when the first non-zero Golomb-Rice coded transform coefficient in a TU is coded as abs_remainder and dec_abs_level, respectively.

In another embodiment, updating the replacement variable HistValue can be based on the first non-zero Golomb-Rice coded transform coefficient in the TU that is coded as abs_remainder or dec_abs_level. The HistValue can be updated based on the quantized level of the transform coefficient according to Eqn. (11) and the updated HistValue will be used in the derivation of Rice parameter for remaining abs_remainder and dec_abs_level syntax elements. In further embodiments, the HistValue is updated with the absolute level of last significant coefficient of the TU as shown in Eqn. (12) and the updated HistValue will be used in the derivation of Rice parameter for remaining abs_remainder and dec_abs_level syntax elements within the current TU.

At block 808, the process 800 involves calculating the Rice parameters for the TU in the CTU as discussed above based on the updated replacement variable HistValue. At block 810, the process 800 involves decoding the binary strings or binary representations of TU in the CTU into coefficient values based on the calculated Rice parameters, such as through a combination of truncated Rice (TR) and limited k-th order EGK as specified in the VVC specification. At block 812, the process 800 involves reconstructing the pixel values for the TU in the CTU through, for example, reverse quantization and reversion transformation as discussed above with respect to FIG. 2. At block 814, the process 800 involves outputting the decoded partition of the video.

While in the above description, TUs are described and illustrated in the figures (e.g., FIG. 6), the same techniques can be applied to transform blocks (TBs). In other words, in the embodiments presented above (including the figures), TUs can also represent TBs.

Figure 9:
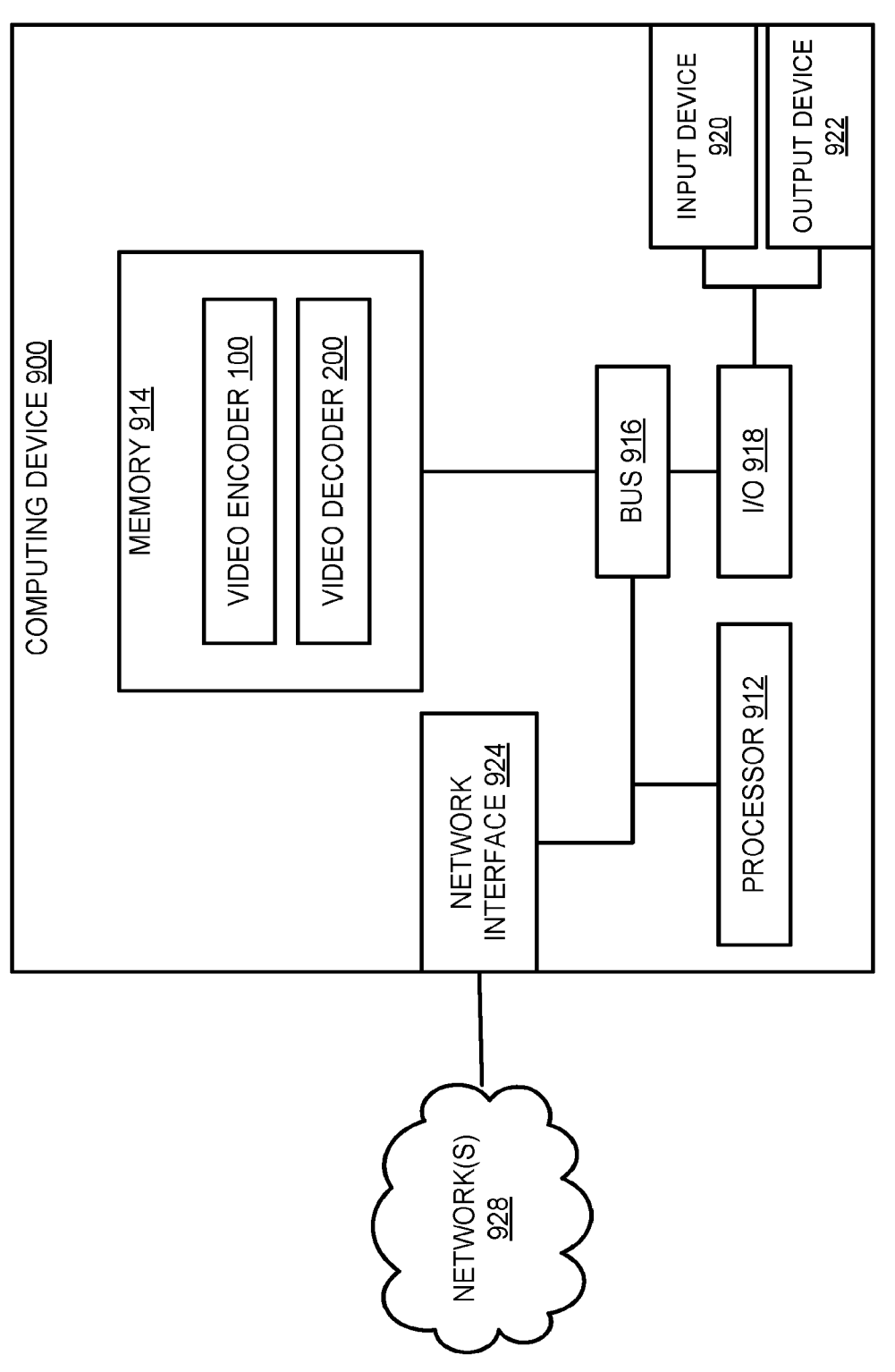
FIG. 9 depicts an example of a computing system that can be used to implement some embodiments of the present disclosure.

Computing System Example for Implementing Dependent Quantization for Video Coding Any suitable computing system can be used for performing the operations described herein. For example, FIG. 9 depicts an example of a computing device 900 that can implement the video encoder 100 of FIG. 1 or the video decoder 200 of FIG. 2. In some embodiments, the computing device 900 can include a processor 912 that is communicatively coupled to a memory 914 and that executes computer-executable program code and/or accesses information stored in the memory 914. The processor 912 may comprise a microprocessor, an application-specific integrated circuit ("ASIC"), a state machine, or other processing device. The processor 912 can include any of a number of processing devices, including one. Such a processor can include or may be in communication with a computer-readable medium storing instructions that, when executed by the processor 912, cause the processor to perform the operations described herein.

The memory 914 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 900 can also include a bus 916. The bus 916 can communicatively couple one or more components of the computing device 900. The computing device 900 can also include a number of external or internal devices such as input or output devices. For example, the computing device 900 is shown with an input/output ("I/O") interface 918 that can receive input from one or more input devices 920 or provide output to one or more output devices 922. The one or more input devices 920 and one or more output devices 922 can be communicatively coupled to the I/O interface 918. The communicative coupling can be implemented via any suitable manner (e.g., a connection via a printed circuit board, connection via a cable, communication via wireless transmissions, etc.). Non-limiting examples of input devices 920 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 922 include an LCD screen, an external monitor, a speaker, or any other device that can be used to display or otherwise present outputs generated by a computing device.

The computing device 900 can execute program code that configures the processor 912 to perform one or more of the operations described above with respect to FIGS. 1-8. The program code can include the video encoder 100 or the video decoder 200. The program code may be resident in the memory 914 or any suitable computer-readable medium and may be executed by the processor 912 or any other suitable processor.

The computing device 900 can also include at least one network interface device 924. The network interface device 924 can include any device or group of devices suitable for establishing a wired or wireless data connection to one or more data networks 928. Non-limiting examples of the network interface device 924 include an Ethernet network adapter, a modem, and/or the like. The computing device 900 can transmit messages as electronic or optical signals via the network interface device 924.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for decoding a video, the method comprising:

accessing a binary string representing a partition of the video, the partition comprising a plurality of coding tree units (CTUs);

decoding each CTU of the plurality of CTUs in the partition, decoding the CTU comprising decoding a transform unit (TU) of the CTU by:

updating a replacement variable HistValue for calculating Rice parameters for the TU, wherein updating the replacement variable Hist Value is performed independently of another TU of the CTU that precedes the TU and another CTU of the plurality of CTUs that precedes the CTU;

calculating the Rice parameters for the TU in the CTU based on the updated replacement variable HistValue; and decoding the binary string corresponding to the TU in the CTU into coefficient values of the TU based on the calculated Rice parameters; and determining pixel values for the TU in the CTU from the coefficient values; and outputting a decoded partition of the video comprising the decoded plurality of CTUs in the partition, wherein updating the replacement variable Hist Value comprises:

updating a history counter StatCoeff for a color component; and prior to calculating a next Rice parameter, updating the replacement variable Hist Value based on the updated history counter StatCoeff for the color component by:

$$HistValue[cIdx]=1<<StatCoeff[cIdx],$$

wherein updating the history counter StatCoeff comprises:

in response to determining that a first non-zero Golomb-Rice coded transform coefficient in a TU is coded as abs_remainder, updating a history counter StatCoeff for a color component cIdx as:

$$StatCoeff[cIdx]=(StatCoeff\_init[cIdx]+Floor(Log\ 2(abs\_remainder[cIdx]))+2)>>1;\ and$$

in response to determining that the first non-zero Golomb-Rice coded transform coefficient in the TU is coded as dec_abs_level, updating the history counter StatCoeff for a color component cIdx as:

StatCoeff[cIdx]=(StatCoeff_init[cIdx]+Floor(Log 2(dec_abs_level[cIdx])))>>1, wherein Floor(x) represents the largest integer less than or equal to x, and Log 2(x) is base-2 logarithm of x, wherein StatCoeff_init is an initial value of the history counter StatCoeff, wherein the StatCoeff_init for a color component cIdx is determined for the partition based on at least one of:

statCoeff_init[idx]=2*Floor(Log 2(BitDepth−10)) or statCoeff_init[idx]=Clip(MIN_Stat,MAX_Stat,(int) ((19−QP)/6))−1, wherein BitDepth specifies the bit depth of the samples of the luma or chroma arrays, and Floor(x) represents the largest integer less than or equal to x, and wherein MIN_Stat, MAX_Stat are two predefined integers, respectively, OP is the initial quantization parameter for each partition and Clip( ) is defined as follows:

$$\mathrm{Clip}(x, y, z) = \begin{cases} x; & z < x \\ y; & z > y \\ z; & \text{otherwise} \end{cases}.$$

2. The method of claim 1, wherein the partition is a frame, a slice, or a tile.

3. The method of claim 1, further comprising setting the history counter StatCoeff to an initial value based on a bit depth of samples of luma and chroma arrays of the video or a quantization parameter of the current partition.

4. A system comprising:
a processing device; and
a non-transitory computer-readable medium communicatively coupled to the processing device, wherein the processing device is configured to execute program code stored in the non-transitory computer-readable medium and thereby perform operations comprising:
accessing a binary string representing a partition of a video, the partition comprising a plurality of coding tree units (CTUs);
decoding each CTU of the plurality of CTUs in the partition, decoding the CTU comprising decoding a transform unit (TU) of the CTU by:
updating a replacement variable HistValue for calculating Rice parameters for the TU, wherein updating the replacement variable Hist Value is performed independently of another TU of the CTU that precedes the TU and another CTU of the plurality of CTUs that precedes the CTU;
calculating the Rice parameters for the TU in the CTU based on the updated replacement variable Hist Value; and
decoding the binary string corresponding to the TU in the CTU into coefficient values of the TU based on the calculated Rice parameters; and
determining pixel values for the TU in the CTU from the coefficient values; and
outputting a decoded partition of the video comprising the decoded plurality of CTUs in the partition, wherein updating the replacement variable Hist Value comprises:
updating a history counter StatCoeff for a color component; and
prior to calculating a next Rice parameter, updating the replacement variable Hist Value based on the updated history counter StatCoeff for the color component by:

HistValue[cIdx]=1<<StatCoeff[cIdx], wherein updating the history counter StatCoeff comprises:
in response to determining that a first non-zero Golomb-Rice coded transform coefficient in a TU is coded as abs_remainder, updating a history counter StatCoeff for a color component cIdx as:

StatCoeff[cIdx]=(StatCoeff_init[cIdx]+Floor(Log 2(abs_remainder[cIdx]))+2)>>1; and in response to determining that the first non-zero Golomb-Rice coded transform coefficient in the TU is coded as dec_abs_level, updating the history counter StatCoeff for a color component cIdx as:

StatCoeff[cIdx]=(StatCoeff_init[cIdx]+Floor(Log 2(dec_abs_level[cIdx])))>>1, wherein Floor(x) represents the largest integer less than or equal to x, and Log 2(x) is base-2 logarithm of x, wherein StatCoeff_init is an initial value of the history counter StatCoeff, wherein the StatCoeff_init for a color component cIdx is determined for the partition based on at least one of:

statCoeff_init[idx]=2*Floor(Log 2(BitDepth−10)) or statCoeff_init[idx]=Clip(MIN_Stat,MAX_Stat,(int) ((19−QP)/6))−1, wherein BitDepth specifies the bit depth of the samples of the luma or chroma arrays, and Floor(x) represents the largest integer less than or equal to x, and wherein MIN_Stat, MAX_Stat are two predefined integers, respectively, QP is the initial quantization parameter for each partition and Clip( ) is defined as follows:

$$\mathrm{Clip}(x, y, z) = \begin{cases} x; & z < x \\ y; & z > y \\ z; & \text{otherwise} \end{cases}.$$

5. A method for encoding a video, the method comprising:
accessing a partition of the video, the partition comprising a plurality of coding tree units (CTUs);
processing the partition of the video to generate a binary representation of the partition, the processing comprising:
encoding each CTU of the plurality of CTUs in the partition, encoding the CTU comprising encoding a transform unit (TU) of the CTU by:
updating a replacement variable HistValue for calculating Rice parameters for the TU, wherein updating the replacement variable Hist Value is performed independently of (a) another TU of the CTU that precedes the TU and (b) another CTU of the plurality of CTUs that precedes the CTU;

calculating the Rice parameters for the TU in the CTU based on the updated replacement variable Hist Value; and encoding coefficient values of the TU into a binary representation corresponding to the TU in the CTU based on the calculated Rice parameters; and encoding the binary representation of the partition into a bitstream of the video, wherein updating the replacement variable Hist Value comprises:

updating a history counter StatCoeff for a color component; and prior to calculating a next Rice parameter, updating the replacement variable Hist Value based on the updated history counter StatCoeff for the color component by:

$$\text{HistValue[cIdx]}=1 << \text{StatCoeff[cIdx]},$$

wherein updating the history counter StatCoeff comprises:

in response to determining that a first non-zero Golomb-Rice coded transform coefficient in a TU is coded as abs_remainder, updating a history counter StatCoeff for a color component cIdx as:

$$\text{StatCoeff[cIdx]}=(\text{StatCoeff\_init[cIdx]}+\text{Floor(Log}\\ 2(\text{abs\_remainder[cIdx]}))+2)>>1;\text{ and}$$

in response to determining that the first non-zero Golomb-Rice coded transform coefficient in the TU is coded as dec_abs_level, updating the history counter StatCoeff for a color component cIdx as:

$$\text{StatCoeff[cIdx]}=(\text{StatCoeff\_init[cIdx]}+\text{Floor(Log}\\ 2(\text{dec\_abs\_level[cIdx]})))>>1,$$

wherein Floor(x) represents the largest integer less than or equal to x, and Log 2(x) is base-2 logarithm of x, wherein StatCoeff_init is an initial value of the history counter StatCoeff, wherein the StatCoeff_init for a color component cIdx is determined for the partition based on at least one of:

$$\text{statCoeff\_init[idx]}=2*\text{Floor(Log 2(BitDepth}-10))\text{ or}$$

$$\text{statCoeff\_init[idx]}=\text{Clip(MIN\_Stat,MAX\_Stat,(int)}\\ ((19-QP)/6))-1,$$

wherein BitDepth specifies the bit depth of the samples of the luma or chroma arrays, and Floor(x) represents the largest integer less than or equal to x, and wherein MIN_Stat, MAX_Stat are two predefined integers, respectively, QP is the initial quantization parameter for each partition and Clip( ) is defined as follows:

$$\text{Clip}(x, y, z) = \begin{cases} x; & z < x \\ y; & z > y \\ z; & \text{otherwise} \end{cases}.$$

6. The method of claim 5, wherein the partition is a frame, a slice, or a tile.

7. The method of claim 5, further comprising setting the history counter StatCoeff to an initial value based on a bit depth of samples of luma and chroma arrays of the video or a quantization parameter of the current partition.

8. A non-transitory computer-readable storage medium, having a computer program and a bitstream stored thereon, wherein the computer program, when executed by a processor, enables the processor to perform the steps of the method for encoding a video of claim 5 to generate the bitstream.

\* \* \* \* \*